(12) United States Patent
Barnhart

(10) Patent No.: US 9,594,251 B2
(45) Date of Patent: Mar. 14, 2017

(54) OPTICAL DEVICE

(71) Applicant: Donald Barnhart, Urbana, IL (US)

(72) Inventor: Donald Barnhart, Urbana, IL (US)

( * ) Notice: Subject to any disclaimer, the term of this patent is extended or adjusted under 35 U.S.C. 154(b) by 89 days.

(21) Appl. No.: 14/394,194

(22) PCT Filed: Apr. 12, 2013

(86) PCT No.: PCT/US2013/036489
§ 371 (c)(1),
(2) Date: Oct. 13, 2014

(87) PCT Pub. No.: WO2013/155489
PCT Pub. Date: Oct. 17, 2013

(65) Prior Publication Data
US 2015/0055365 A1    Feb. 26, 2015

Related U.S. Application Data

(60) Provisional application No. 61/624,269, filed on Apr. 14, 2012, provisional application No. 61/802,226, filed on Mar. 15, 2013.

(51) Int. Cl.
*G02B 27/08* (2006.01)
*G02B 17/06* (2006.01)
*G02B 27/02* (2006.01)

(52) U.S. Cl.
CPC .............. *G02B 27/08* (2013.01); *G02B 17/06* (2013.01); *G02B 27/024* (2013.01)

(58) Field of Classification Search
CPC ....... G02B 27/08; G02B 17/06; G02B 27/024
USPC ............. 362/311.02; 359/616, 617; 353/1, 2
See application file for complete search history.

(56) References Cited

U.S. PATENT DOCUMENTS

| | | | | |
|---|---|---|---|---|
| 2,697,380 A | * | 12/1954 | Wyser | G02B 13/08 359/506 |
| 4,040,716 A | * | 8/1977 | Matsubara | G02B 27/08 359/616 |
| 4,494,820 A | * | 1/1985 | Klawitter | G02B 27/08 359/616 |
| 4,576,433 A | * | 3/1986 | Shaughnessy | G02B 27/08 359/616 |
| 4,733,960 A | * | 3/1988 | Bennett | G02B 27/08 353/1 |
| 5,799,939 A | * | 9/1998 | Schneider | A63F 9/0613 273/138.1 |
| 7,207,682 B2 | * | 4/2007 | Stephens | G02B 27/08 359/616 |
| 2003/0169501 A1 | * | 9/2003 | Nelson | G02B 27/08 359/616 |

* cited by examiner

*Primary Examiner* — Laura Tso
(74) *Attorney, Agent, or Firm* — Wendy Thai

(57) ABSTRACT

The invention provides an optical device for displaying one or more images on a picture tube so as to be viewable from the anterior end of the device. The optical device can be used to display abstract or non-abstract subject matter. The optical device includes a picture tube having one or more images to be displayed by the device and an imaging assembly housed in a cavity formed by lateral sides of the picture tube, the imaging assembly having a reflecting surface that reflects the one or more images on the picture tube so as to be viewable from the anterior end of the device.

20 Claims, 27 Drawing Sheets

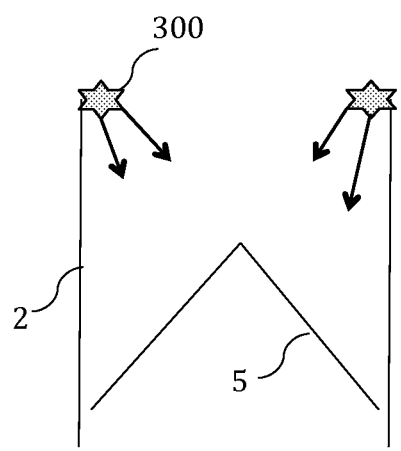
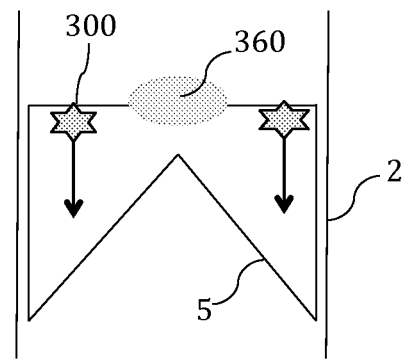
Fig. 5C            Fig. 5D
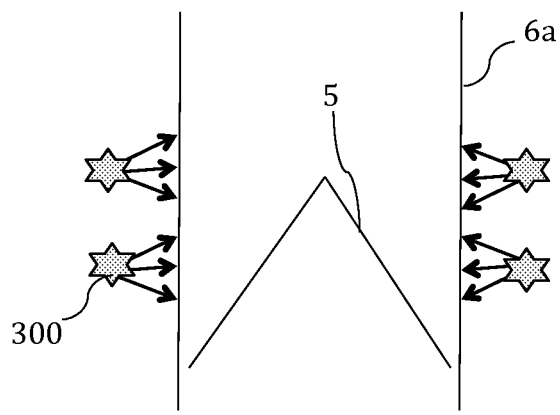
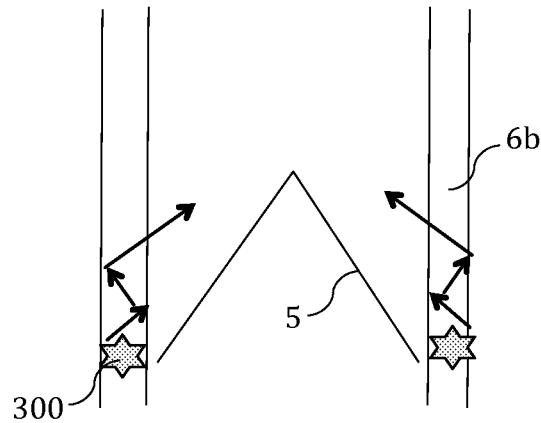
Fig. 5E            Fig. 5F

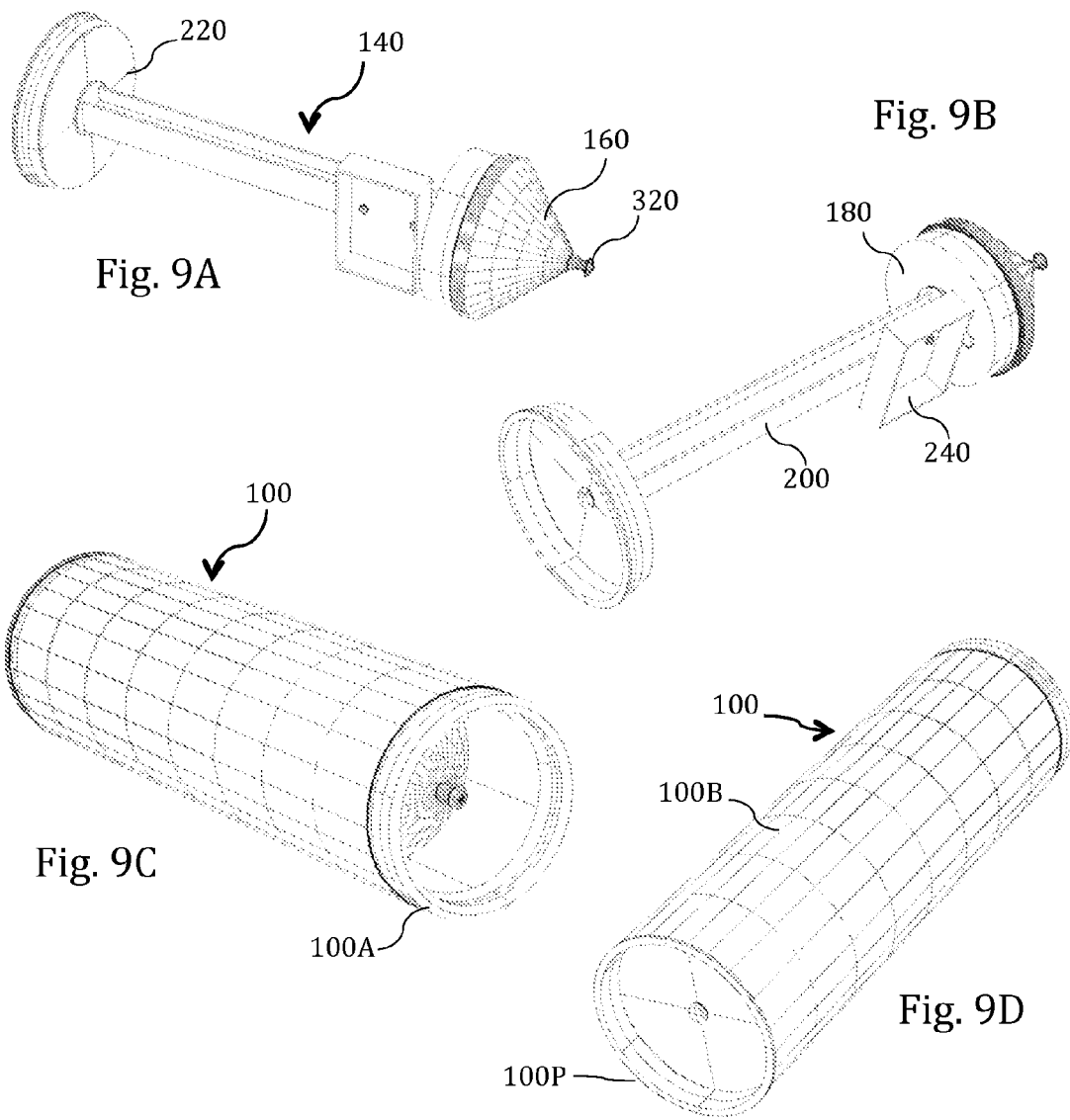

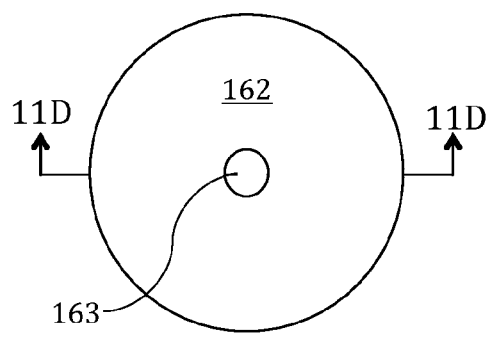
Fig. 11C
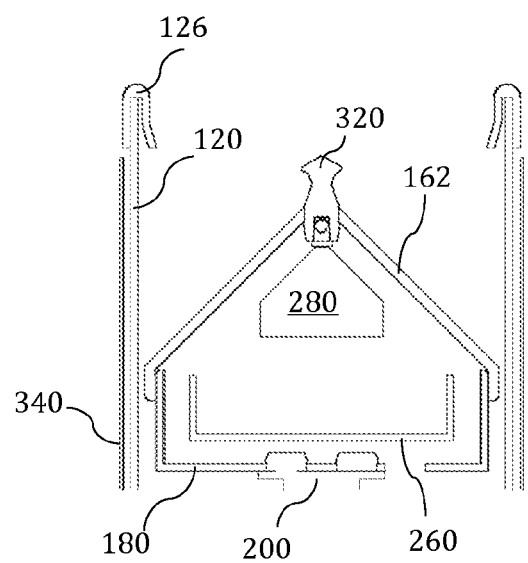
Fig. 11D
Fig. 12A
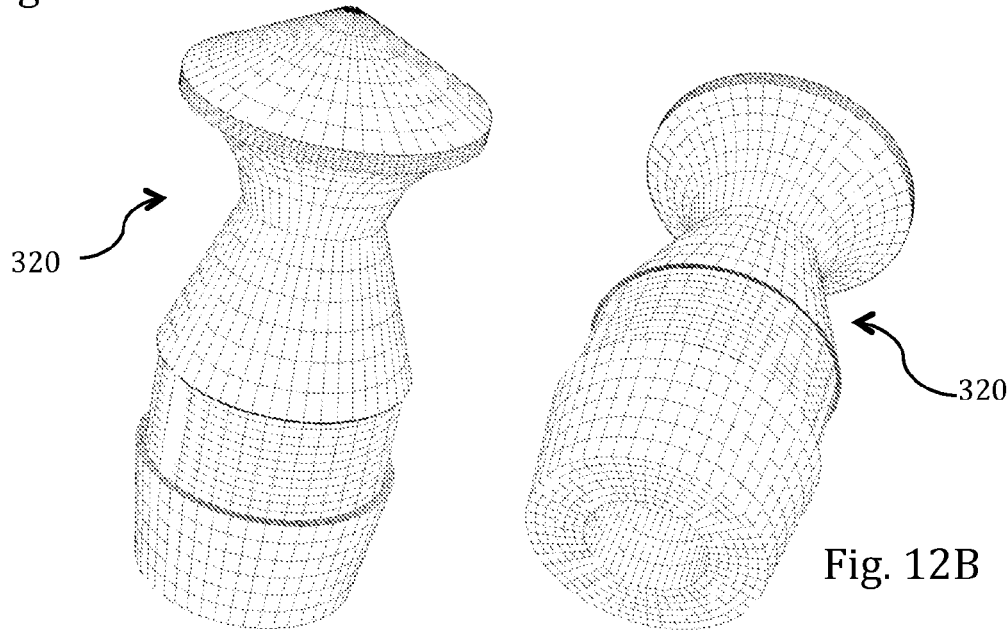
Fig. 12B

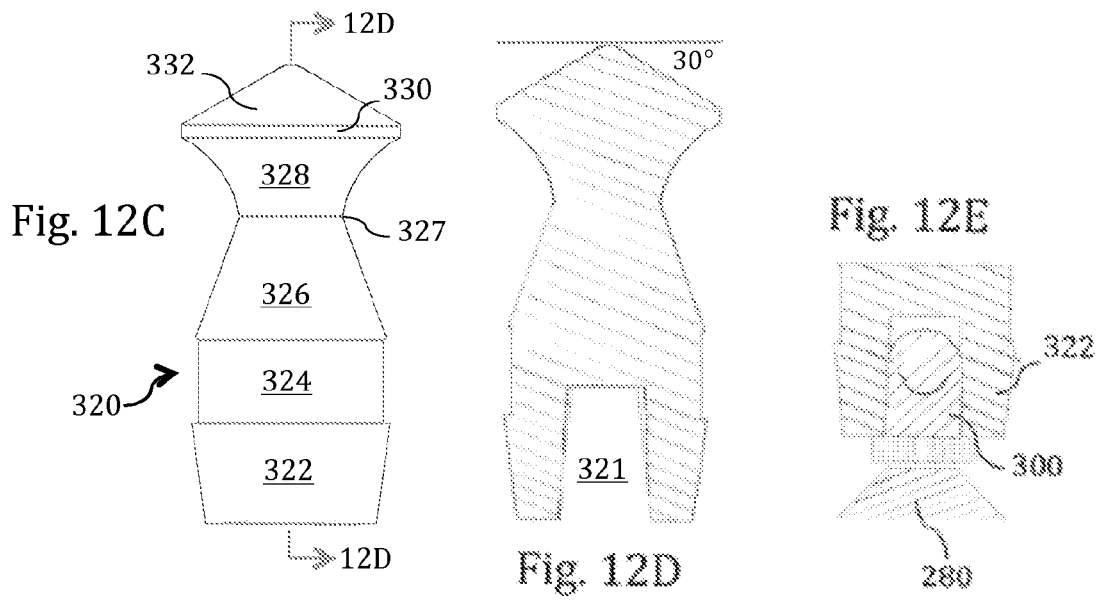
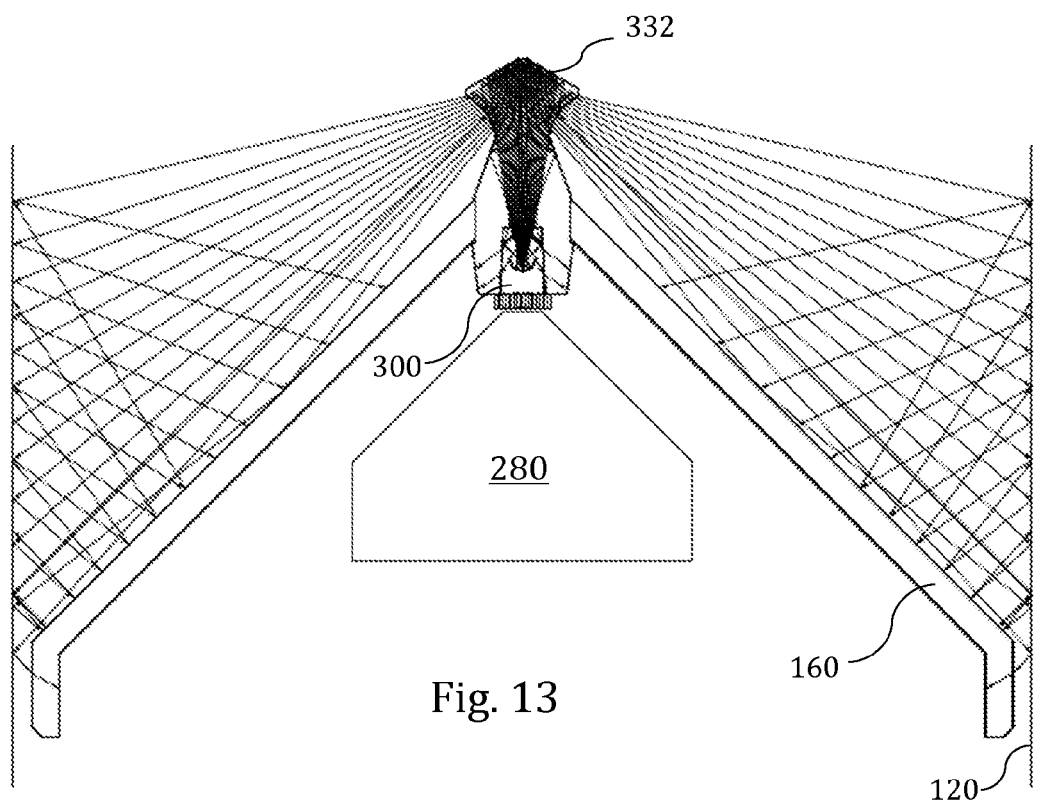
Fig. 13

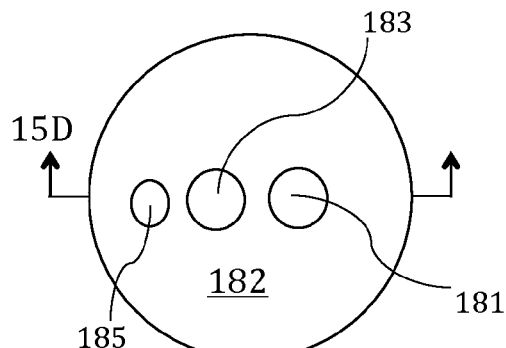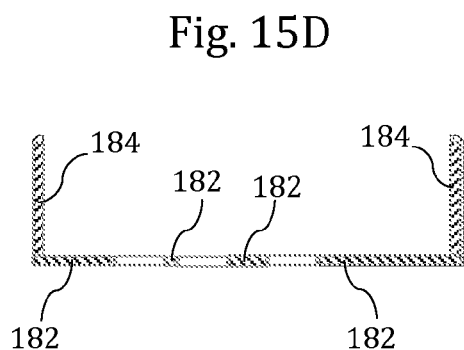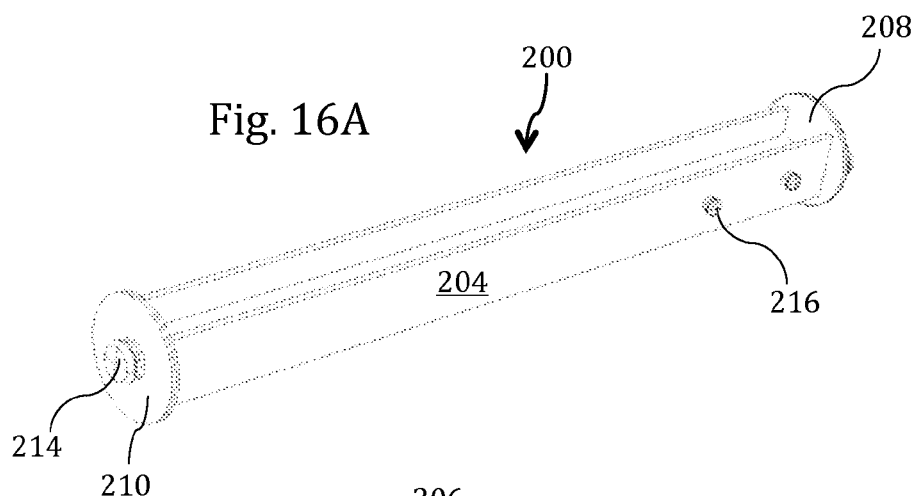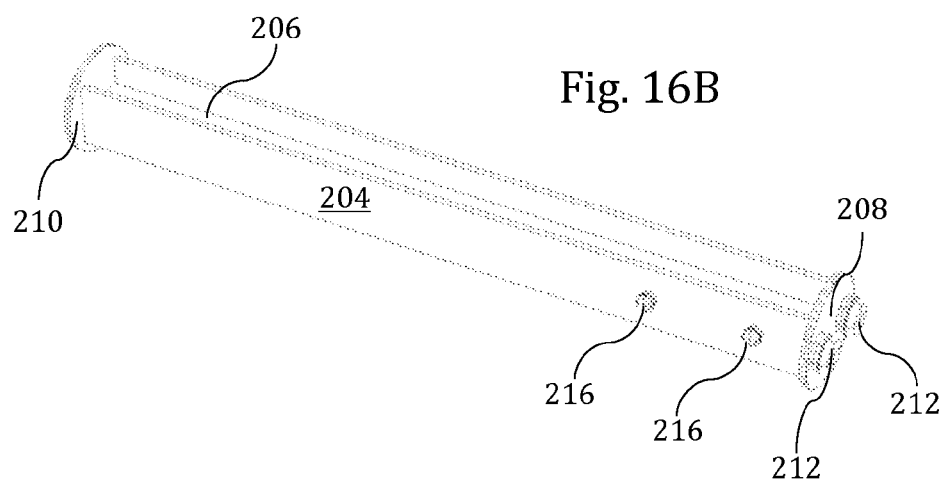

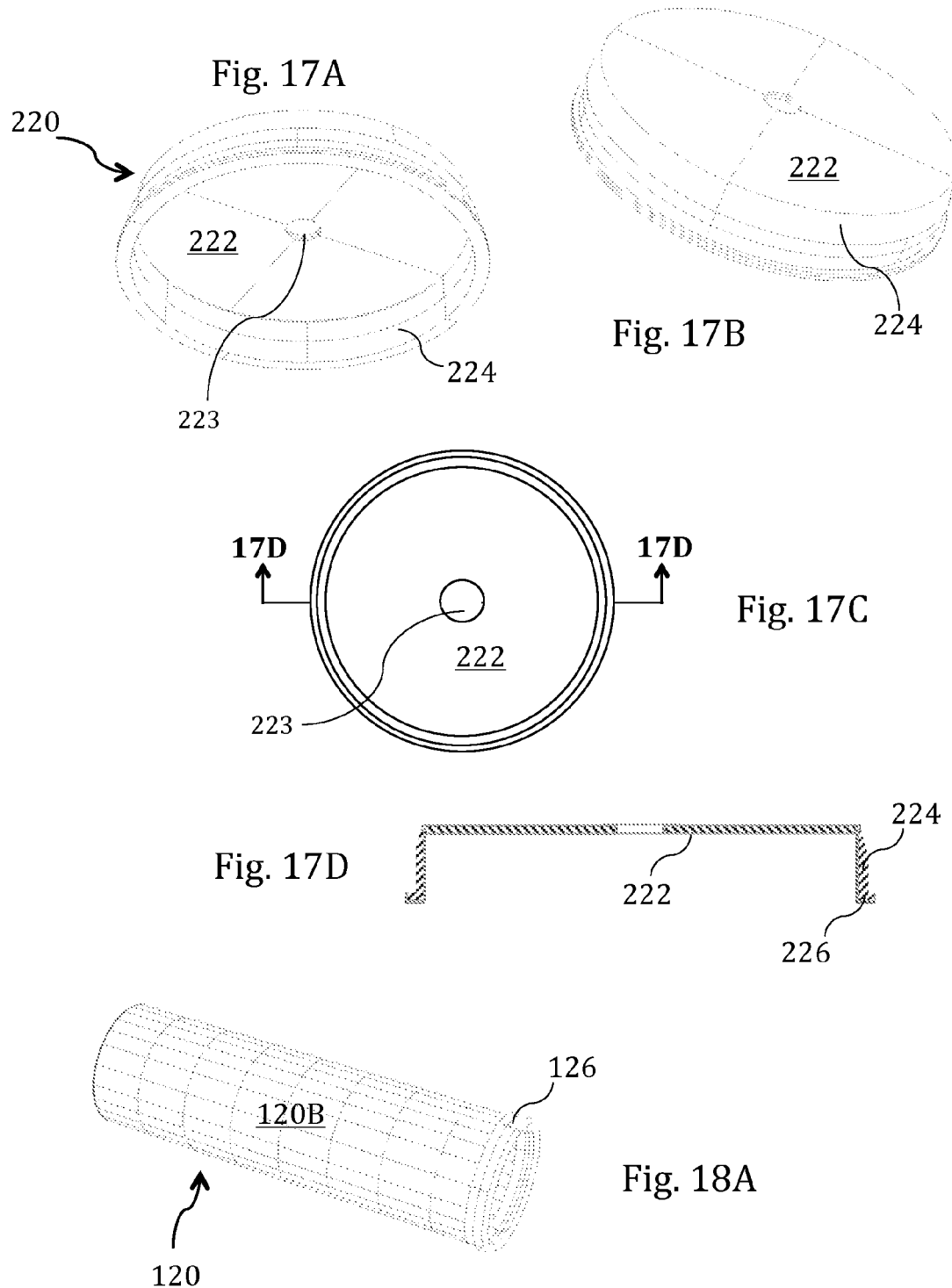

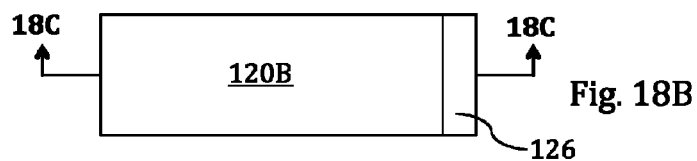
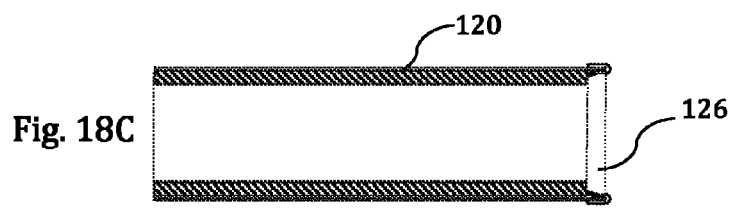
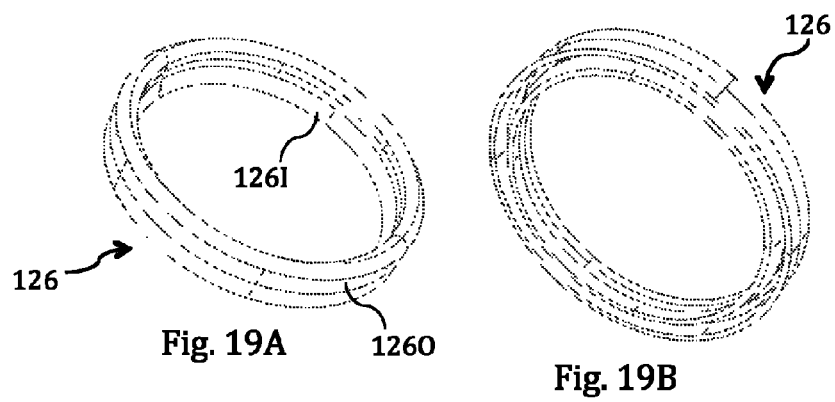
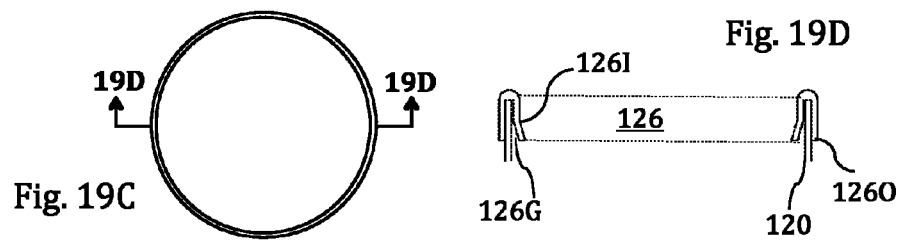

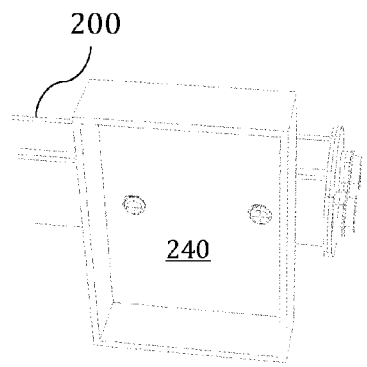
Fig. 21C
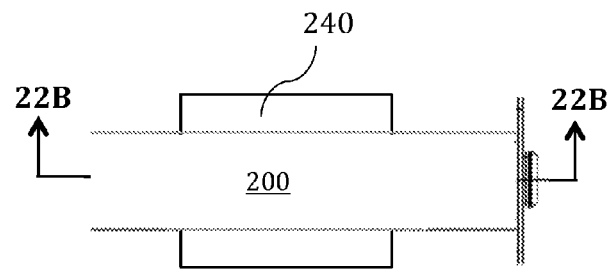
Fig. 21D
Fig. 22A
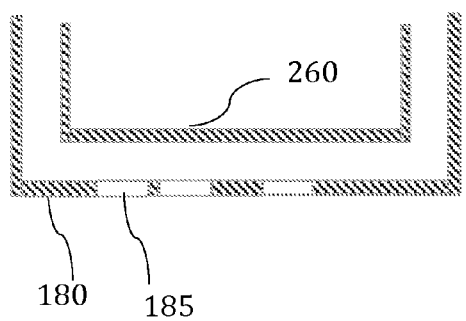
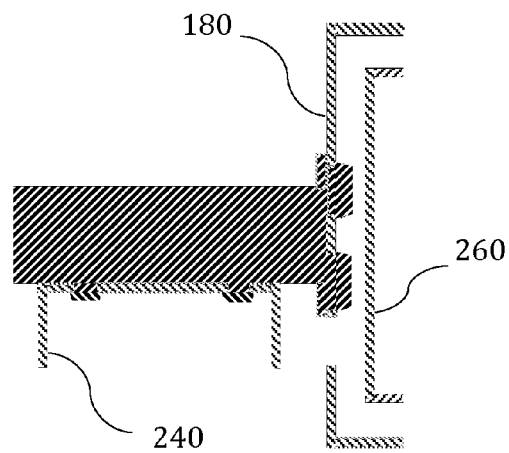
Fig. 22B

R₁ = 820K
R₂ = 820K
R₃ = 4.7K
R₄ = 100
R₅ = 820K
C₁ = 1000pf (for t = 1 minute)
Q₁ = 2N4401 (or lowest cost NPN)

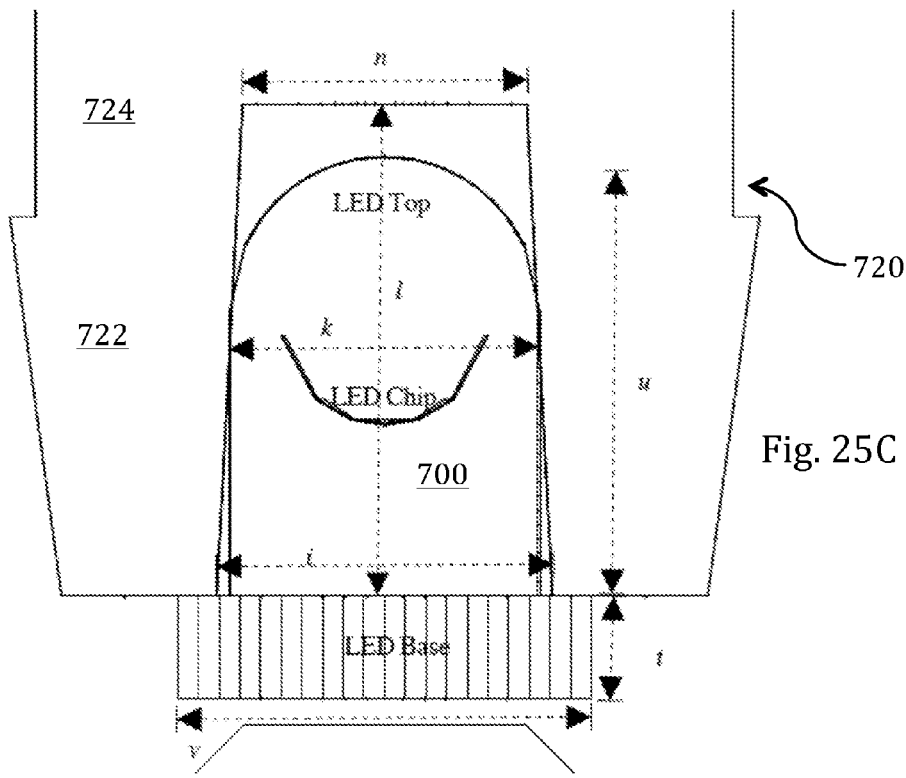
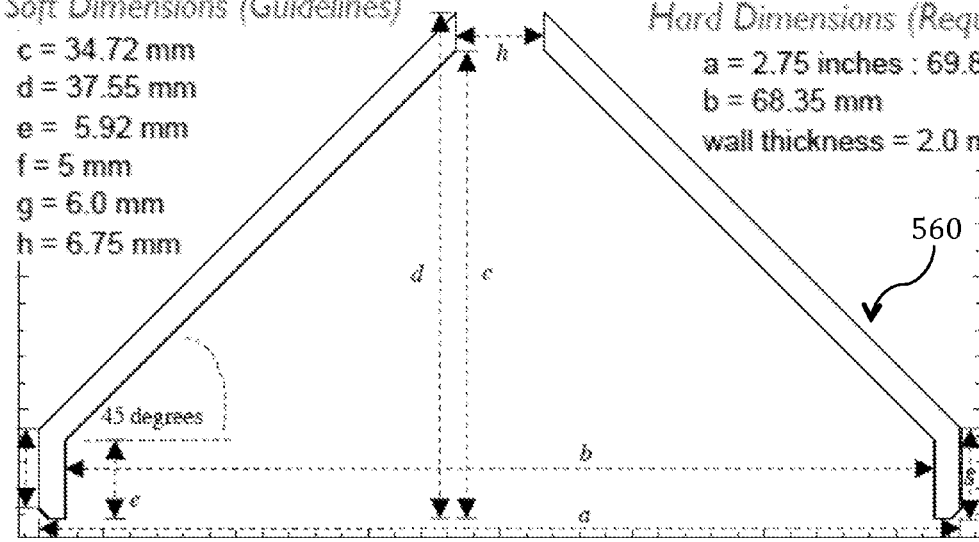
Fig. 25C
Fig. 25D

Hard Dimensions (Required)
a = 20.0 mm
b = 68.35 mm
wall thickness = 1.5 mm

Soft Dimensions (Guidelines)
c = 65.35 mm
d = 18.5 mm
e = 8 mm
f = 8 mm

580

600

Hard Dimensions (Required)
a = 180.0 mm
e = 24.0 mm
i = 4.0 mm

Soft Dimensions (Guidelines)
wall thickness = 1.5 mm
b = 177.0 mm
c = 15.0 mm
d = 25.0 mm
f = 15.0 mm
g = 8.0 mm
j = 6.0 mm
k = 3.0 mm
l = 1.5 mm
m = 2.0 mm
n = 3.5 mm

600

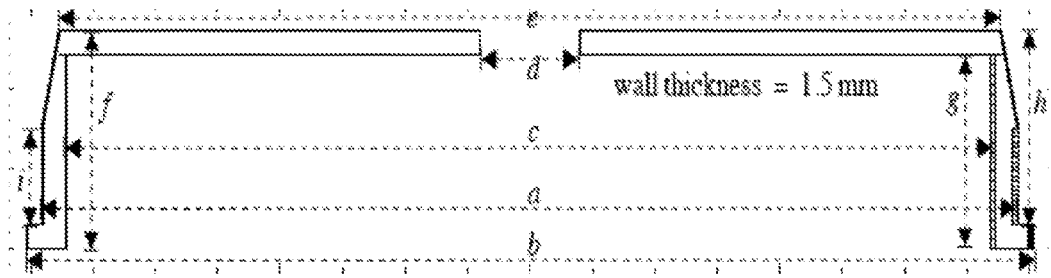
Fig. 25H
Hard Dimensions (Required)
a = 78.25 mm
h = 12.0 mm
i = 6.0 mm
Soft Dimensions (Guidelines)
b = 80.75 mm
c = 1.5 mm
d = 8.0 mm
g = 12.0 mm
f = 13.5 mm
wall thickness = 1.5 mm
Fig. 25I
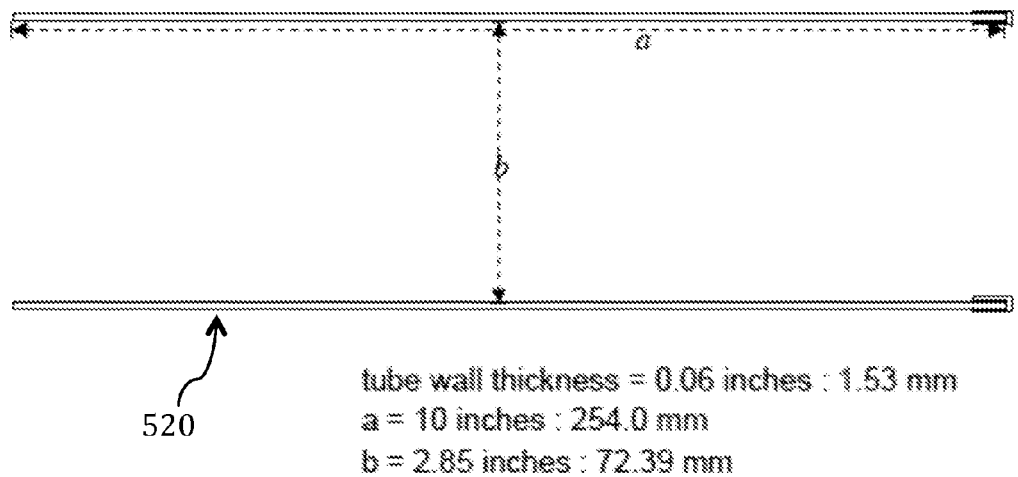
tube wall thickness = 0.06 inches : 1.53 mm
a = 10 inches : 254.0 mm
b = 2.85 inches : 72.39 mm Fig. 25J
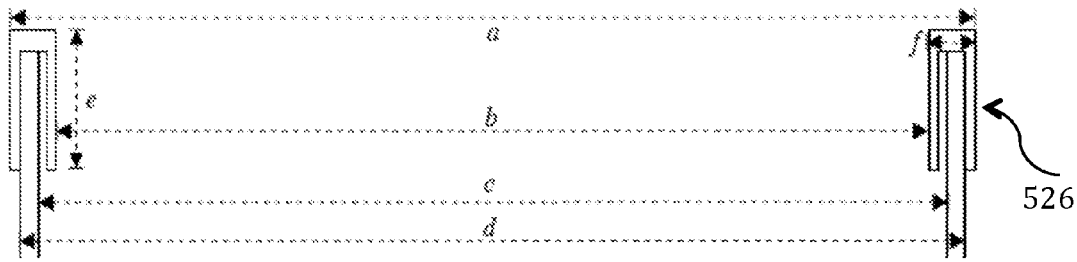
*Hard Dimensions (Required)*
tube wall thickness = 0.06 inches : 1.53 mm
c = 2.85 inches : 72.39 mm
d = 2.85 + 2*0.06 inches = 2.97 inches : 75.44 mm
*Soft Dimensions (Guidelines)*
ring wall thickness = 1.5 mm
a = 78.44 mm
b = 68.39 mm
e = 10 mm
f = 1.524 + 3 + 1 = 5.52 mm
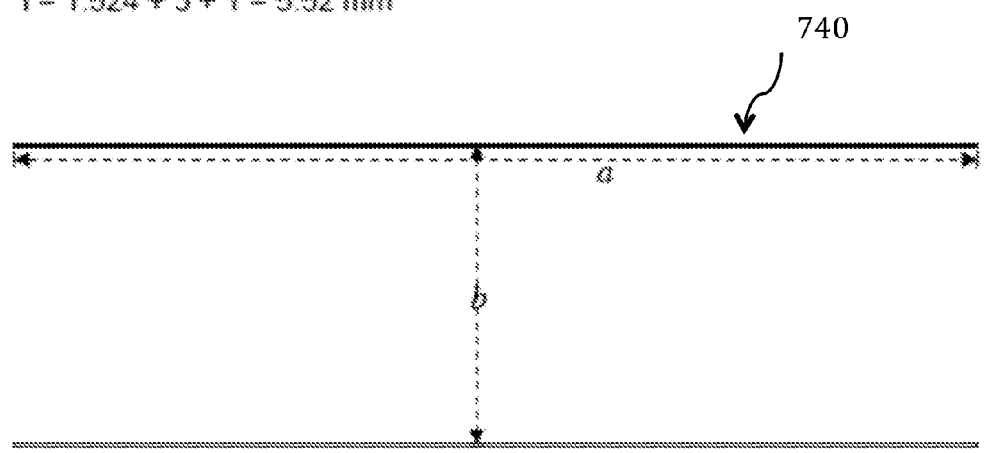
Fig. 25K
sleeve wall thickness = 0.025 inches : 0.635 mm
a = 10 inches : 254.0 mm
b = 3.085 inches : 78.36 mm wall thickness = 1.3 mm
a = 37.5 mm
b = 52.0 mm
c = 24.0 mm
d = 7.0 mm
e = 4.0 mm
height = 12 mm wall thickness = 1.72 mm
a = 0.95 inches = 24.13 mm
b = 0.7 inches = 17.78 mm
c = 0.11 inches = 2.72 mm
d = 0.279 inches = 7.07 mm

OPTICAL DEVICE

This application is a national stage application under 35 U.S.C. §371 of PCT/US2013/036489, filed Apr. 12, 2013 and published as WO 2013/155489, which claims priority of U.S. provisional application Ser. No. 61/802,226, filed Mar. 15, 2013 and 61/624,269, filed Apr. 14, 2012. The contents of these applications are incorporated herein by reference in their entirety.

RELATED APPLICATIONS

This application claims priority to U.S. provisional application Ser. No. 61/802,226, filed Mar. 15, 2013, and U.S. provisional application Ser. No. 61/624,269, filed Apr. 14, 2012, the contents of which are incorporated herein by reference in their entirety.

BACKGROUND

The kaleidoscope is a well-known optical device used for amusement, as an artistic or design tool, and for meditation and therapy. Kaleidoscopes utilize light and mirrors to create colorful, symmetrical patterns from tumbling particles or moving images of different colors. Generally, kaleidoscopes are constructed with two or more plane mirrors that extend substantially the length of the scope in parallel orientation relative to the axis of the device. The mirrors so arranged create colorful symmetrical patterns from moving particles or images of different colors, the symmetrical patterns being viewable at the other end of the device.

SUMMARY

The invention provides an optical device for displaying one or more images presented on a picture tube in the device so as to be viewable from one end of the device. The images can be of any abstract or non-abstract subject matter.

In one embodiment, the invention provides an optical device comprising a picture tube that encloses an imaging assembly, in which: (a) the picture tube has a body section adjoining an anterior and a posterior end, the body section has a cavity that encloses the imaging assembly and one or more images, and (b) the imaging assembly includes a mirrored member having a reflecting surface oriented toward the anterior end of the picture tube at an angle less than 90° relative to the cross-sectional plane of the picture tube, thereby allowing the imaging assembly to reflect the one or more images on the picture tube so as to be viewable at the anterior end of the device.

In some embodiments, the picture tube is elongated. In some embodiments, the picture tube includes an elliptical or polygonal cross-sectional opening. In some embodiments, the picture tube has a circular, triangular, square, rectangular, pentagonal or hexagonal cross-sectional opening. In some embodiments, the picture tube has an elliptical or polygonal cross-section. In some embodiments, the picture tube has a circular, triangular, square, rectangular, pentagonal or hexagonal cross-section. In some embodiments, the picture tube has a circular, triangular, square, rectangular, pentagonal or hexagonal cross-section, and independently, a circular, triangular, square, rectangular, pentagonal or hexagonal cross-sectional opening. In some embodiments, the picture tube is cylindrical. In some embodiments, the picture tube is transparent. In some embodiments, the picture tube is made of paper, plastic, canvas, a natural or synthetic fabric or textile, wood, glass, metal, or any combination thereof. In some embodiments, the picture tube has a light emitting diode. In some embodiments, the picture tube has one or more sections in telescopic arrangement thereby allowing the length of the picture tube to extend or contract. In some embodiments, the picture tube has one or more images that are integral to the picture tube. In some embodiments, the one or more images are on a flexible flat stock material lining the interior surface of the picture tube. In some embodiments, the flexible flat stock material includes paper, plastic film, canvas, metal, natural or synthetic fabric or textile, or any combination thereof. In some embodiments, the flexible flat stock material is secured to the interior surface of the picture tube by an adhesive. In some embodiments, the flexible flat stock material is secured to the interior surface of the picture tube using an end ring that includes a channel for receiving the edge of the flat stock material and the edge of the picture tube.

In some embodiments, the imaging assembly includes a planar, mirrored member having a flat reflecting surface. In some embodiments, the imaging assembly includes a convexo-concave mirrored member having a substantially convex reflecting surface. In some embodiments, the imaging assembly includes a conical, pyramidal or frustoconical mirrored member, and wherein the reflecting surface is the lateral surface of the conical, pyramidal, or frustoconical mirrored member. In some embodiments, the reflecting surface is less than 90° relative to the cross-sectional plane of the picture tube. In some embodiments, the reflecting surface is about 45° relative to the cross-sectional plane of the picture tube.

In some embodiments, the imaging assembly further includes an assembly base cover secured to the conical, pyramidal or frustoconical mirrored member to define a cavity within the imaging assembly. In some embodiments, the anchor member, the anterior end of which is secured to the assembly base cover to define a cavity within the imaging assembly. In some embodiments, the anchor member is secured to the imaging assembly base cover through a snap fit mechanism or one or more screws, pins or rivets. In some embodiments, the anchor member and imaging assembly base cover are integrally molded.

In some embodiments, the imaging assembly also includes a light source. In some embodiments, the light source is a light emitting diode. In some embodiments, the light emitting diode is housed in the cavity of the imaging assembly.

In some embodiments, the imaging assembly includes a frustoconical mirrored member and a light pipe partially inserted through the apical opening of the frustoconical mirrored member, the light pipe being effective to transmit light from the light emitting diode in the cavity of the imaging assembly to the one or more images on the picture tube forwardly of the reflecting surface. In some embodiments, the imaging assembly includes an electronic circuit coupling the light emitting diode to a power source. In some embodiments, the power source is one or more batteries. In some embodiments, the one or more batteries are housed in a battery box located in the cavity of the imaging assembly. In some embodiments, the one or more batteries is housed in a battery box secured to the anchor member external to the imaging assembly cavity.

In some embodiments, the optical device also includes an outer sleeve having a body section adjoining an anterior and a posterior end, in which the body section includes a cavity substantially coterminous with the picture tube so as to enable the picture tube to be inserted into the cavity of the outer sleeve, the outer surface of the picture tube being in slidable contact with the interior surface of the outer sleeve.

In some embodiments, the optical device also includes anchor member, the anterior end of which is secured to the mirrored member. In some embodiments, the anchor member is secured to the mirrored member through a snap fit mechanism or one or more screws, pins or rivets. In some embodiments, the anchor member and mirrored member are integrally molded. In some embodiments, posterior end of the anchor member is secured to a posterior base. In some embodiments, the posterior base is secured to the anchor member through a snap fit mechanism or one or more screws, pins or rivets. In some embodiments, the posterior base and anchor member are integrally molded.

In some embodiments, the optical device also includes a light source. In some embodiments, the light source is a light emitting diode. In some embodiments, light emitting diode is attached to the peripheral edge of the reflecting surface of the mirrored member and is oriented toward the anterior end of the device so as to illuminate the one or more images forwardly of the reflecting surface. In some embodiments, the light emitting diode is attached to the anterior end of the device and oriented into the device so as to illuminate the one or more images on the picture tube. In some embodiments, the light emitting diode is secured to the outer sleeve of the device. In some embodiments, the optical device includes an electronic circuit coupling the light emitting diode to a power source. In some embodiments, the power source is one or more batteries.

In some embodiments, the optical device further includes an imaging lens. In some embodiments, the imaging lens is anterior to the reflecting surface. In some embodiments, imaging lens is held by a frame secured to the peripheral edge of the imaging assembly.

In another aspect, the invention provides an array formed using a plurality of optical devices in which the picture tube of each device includes a portion of an image displayed by the array.

In another aspect, the invention provides a light pipe that has a base adjoining a narrow mid-section, the narrow mid-section adjoining an upper section, wherein: (a) the base includes an opening effective to receive a light source, (b) the upper section includes an upwardly tapered section adjoining a constriction, the constriction adjoining an outwardly flared section, the outwardly flared section adjoining a cylindrical base, which adjoins a conical cap or top. In some embodiments, the conical cap includes an internally reflecting lateral surface effective to reflect light toward the outwardly flared section. In some embodiments, the internally reflecting lateral surface is oriented at about 30° relative to the base of the conical cap.

Any feature or combination of features described herein are included within the scope of the present invention provided that the features included in any such combination are not mutually inconsistent as will be apparent from the context, this specification and the knowledge of one of ordinary skill in the art.

Unless otherwise defined, all technical and scientific terms used herein have the same meaning as commonly understood by one of ordinary skill in the art to which this invention belongs. In case of conflict, the present specification, including definitions, will control. In addition, the materials, methods, and examples are illustrative only and not intended to be limiting. Although methods and materials similar or equivalent to those described herein can be used to practice the invention, suitable methods and materials are described below.

All patents and publications referenced or mentioned herein are indicative of the levels of skill of those skilled in the art to which the invention pertains, and each such referenced patent or publication is hereby incorporated by reference to the same extent as if it had been incorporated by reference in its entirety individually or set forth herein in its entirety. Applicants reserve the right to physically incorporate into this specification any and all materials and information from any such cited patents or publications.

Other features and advantages of the invention will be apparent from the following detailed description and from the claims.

BRIEF DESCRIPTION OF THE DRAWINGS

FIGS. 5A-5F illustrate the various ways in which a device of the invention can be illuminated including inclusion of a light source at the apex of a conical mirrored member (5A), from the peripheral edge of the mirrored member (5B), from the anterior end of the device (5C), from the bottom of an imaging lens disposed on the anterior end of the device (5D), through the transparent sides of a picture tube (5E), and through the edge of a thick transparent picture tube wall (5F).

FIGS. 8A-8B illustrate the use of a plurality of optical devices of the invention to form an array for an image matrix in which each device displays a portion of a larger image.

FIGS. 9A-9D are various views of a mirrored assembly and optical device of the invention including: anterior and posterior perspective views of the mirrored assembly without the picture tube and outer sleeve (9A-9B), and anterior and poaterior perspective views of the mirrored assembly within the picture tube and outer sleeve (9C and 9D).

FIGS. 11A-11D are various views of a conical mirrored member with light pipe and mirrored assembly base including: an anterior perspective view (11A), a posterior perspective view (11B), a top view (11C) and a sectional view along line 11D-11D (11D).

FIGS. 12A-12E are various views of a light pipe including: a side perspective view (12A), bottom perspective view (12B), a side view (12C), a sectional view along line 12D-12D, and an enlarged view of the base of the light pipe with inserted LED (12E)

FIG. 13 is a sectional view of the mirrored member, LED and light pipe sub-assembly illustrating the path of light emitting from the LED through the light pipe and into the viewing chamber of a device of the invention.

FIGS. 15A-15D are various views of an imaging assembly base including: an anterior perspective view (15A), a posterior perspective view (15B), a top view (15C) and a sectional view alone lines 15D-15D (15D).

FIGS. 16A-16F are various views of an imaging assembly anchor member including: a side perspective view from the posterior end (16A), a side perspective view from the anterior end (16B), a side view (16C), a sectional view along lines 16D-16D, a side view perpendicular to that shown in 16C (16E), and a sectional view along line 16F-16F (16F).

FIGS. 17A-17D are various views of a posterior cover for the optical device including: a bottom perspective view (17A), a top perspective view (17B), a top view (17C), and a sectional view along lines 17D-17D (17D).

FIGS. 18A-18C are various views of a picture tube including: a side perspective view (18A), a side view (18B), a sectional view along lines 18C-18C (18C).

FIGS. 19A-19D are various views of a picture tube end ring including: a top perspective view (19A), a bottom perspective view (19B), a top view (19C) and a sectional view along lines 19D-19D (19D).

FIGS. 21A-21D illustrate various placement of a battery holder including: within the assembly base (top perspective view 21A, top view 21B) and mounted to the side of the anchor member (perspective view 21C, side view 21D).

FIGS. 22A-B are sectional views of a battery holder including a sectional view of the placement shown in FIG. 21B along line 22A (22A) and a sectional view of the placement shown in FIG. 21D along line 22B (22B).

DETAILED DESCRIPTION

The invention provides an optical device for displaying one or more images on a picture tube in the device so as to be viewable from one end of the device. The optical device of the invention includes a picture tube enclosing an imaging assembly. The picture tube has a body section disposed between anterior and posterior ends, the body section having one or more lateral sides that form an interior cavity housing the imaging assembly. The imaging assembly includes a mirrored member oriented toward the anterior end of the device and an anchor member for adjusting the position of the imaging assembly. The optical device of the invention optionally includes: an outer sleeve to which the imaging assembly is secured, a light source for illuminating the interior of the device, a power source for the light, as well as an imaging lens at the anterior end to facilitate viewing of the images or to achieve stereoscopic effect.

Figure 1A:
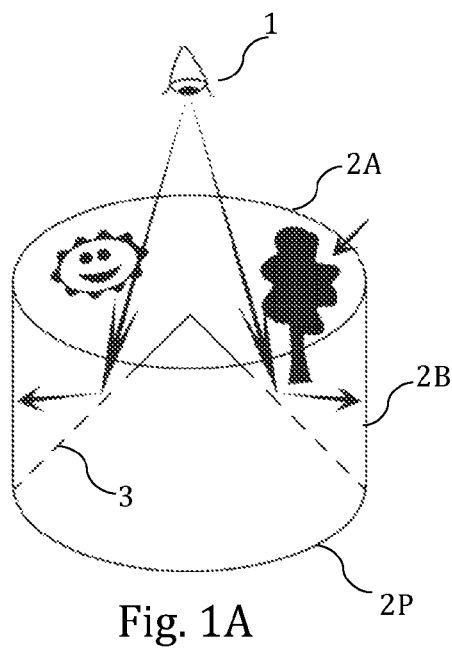
FIGS. 1A-1B illustrate the arrangement of a convex mirror in the cavity of a cylindrical picture tube for reflecting one or more images in the inner wall of a picture tube so as to be viewable at one end of the picture tube. Dotted lines indicate images or components hidden behind the wall of the picture tube.

The invention is generally illustrated in FIG. 1A. An imaging assembly disposed in the cavity of a picture tube is used to reflect an image on the internal lateral surface of the picture tube. In FIG. 1A, picture tube 2 is cylindrical and includes one or more images on its internal lateral surface. The one or more images follow the internal circumference of the picture tube. The imaging assembly includes convex reflecting surface 3, which is oriented toward the anterior end of the device, i.e. toward observer 1. As such, the one or more images on the internal lateral surface of the picture tube are reflected by the reflecting surface so as to be viewable by an observer at the anterior end.

Picture Tube

The optical device of the invention allows one more images on a picture tube to be viewable at the anterior end of the device. The term "anterior," as used in reference to an optical device of the invention, means the portion of the device nearest the observer. The picture tube has a body section disposed between an anterior and a posterior end. The body section is formed from one or more lateral sides that together define a cavity within which the imaging assembly is disposed. One or more images are presented on the interior surfaces of the picture tube.

Figure 4A:
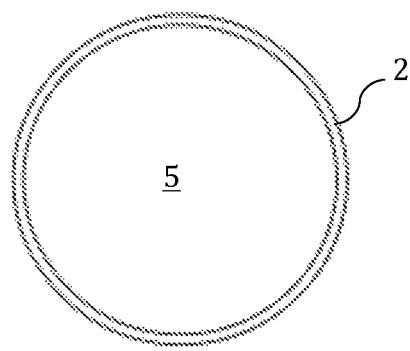
FIGS. 4A-4D illustrate the alignment of the mirrored member relative to the picture tube and outer sleeve.
Figure 4B:
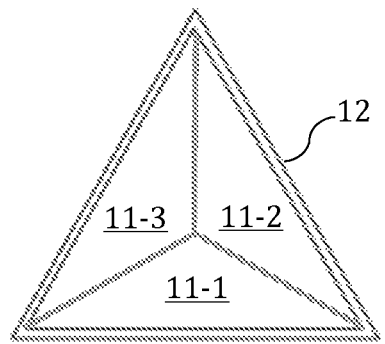
Figure 4C:
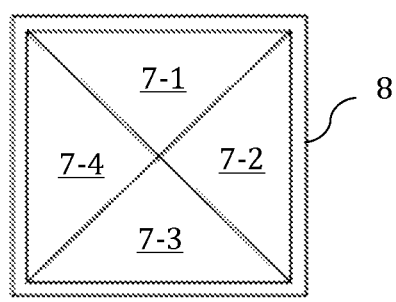
Figure 4D:
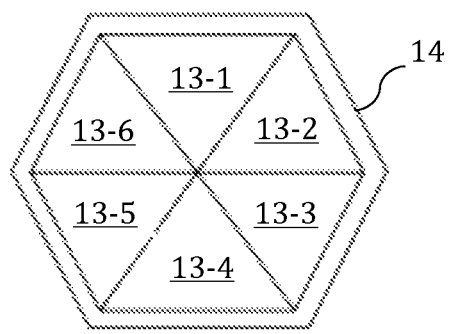

The picture tube can have any exterior shape, dimension or contour so long as at least a cross-sectional portion of the interior cavity accommodates an imaging assembly. For example, where the imaging assembly has a circular cross-section, at least a cross-sectional portion of the interior cavity has an opening at least the size of the imaging assembly. Alternatively, the entire interior cavity of the picture tube can be smooth having a cross-sectional opening that complements the shape of the imaging assembly so as to accommodate the imaging assembly and allow the position of the imaging assembly to be shifted anywhere along the interior cavity of the picture tube. Picture tubes having openings of different shapes for use with various imaging assembly are illustrated in FIGS. 4A-4D. In general, the picture tube for use in a device of the invention has a cross-sectional opening that complement the widest cross-section of the imaging assembly. For example, a picture tube with a cylindrical cross-sectional opening can be used with a conical mirror that has a circular base or cross-section (FIG. 4A); a picture tube that has a square cross-sectional opening is used with a pyramidal mirror that has a square base and a reflecting surface formed by four lateral sides (FIG. 4B); a picture tube that has a hexagonal cross-sectional opening can be used with a hexagonal mirror having a hexagonal base and a reflecting surface formed by six lateral sides (FIG. 4C); and a picture tube that has a triangular cross-sectional opening can be used with a mirror having a triangular base and a reflecting surface formed by three lateral sides (FIG. 4D).

As illustrated above, the interior cavity of the picture tube can be a contiguous curved surface or formed from three or more parallel sides, each having the shape of a parallelogram, e.g. a square or rectangle. In these embodiments, the interior cavity of the picture tube has an n-polygonal cross-section wherein n can be any integer greater than 2. The interior cavity can have the structure of a right or oblique, geometric prism with an elliptical or n-sided polygonal cross-section, wherein n can be any integer greater than 2, such as, for example, a triangular, quadrilateral, pentagonal, hexagonal, heptagonal, octagonal, nonagonal, decagonal, dodecagonal, circular or oval cross-section.

The one or more images on the picture tube can be of any subject matter. The one or more images can be of an abstract subject. The abstract subject can be a form, color, line, or any combination thereof. The one or more images can be of a concrete, recognizable, and/or real world subject matter. The one or more images can be the representation of a single abstract idea or a plurality of ideas, as well as the representation of a single or plurality of concrete, recognizable and/or real world subjects. Where the one or more images can be a plurality of abstract ideas or concrete subject, the ideas or subject can be arranged randomly, according to the principles of art, and/or in a predictable or logical order, pattern and/or temporal sequence. The one or more images can include, for example, a photograph, a naturalistic or representational depiction of still life or landscape, a composition with narrative content (e.g., depicting a event, a sequence of events, or a story), a representation of an abstract idea or composition, or a combination thereof, for example, photorealism or surrealism. The one or more images can be in color or black and white and can be pre-distorted, for example, one or more anamorphic images.

Figure 1B:
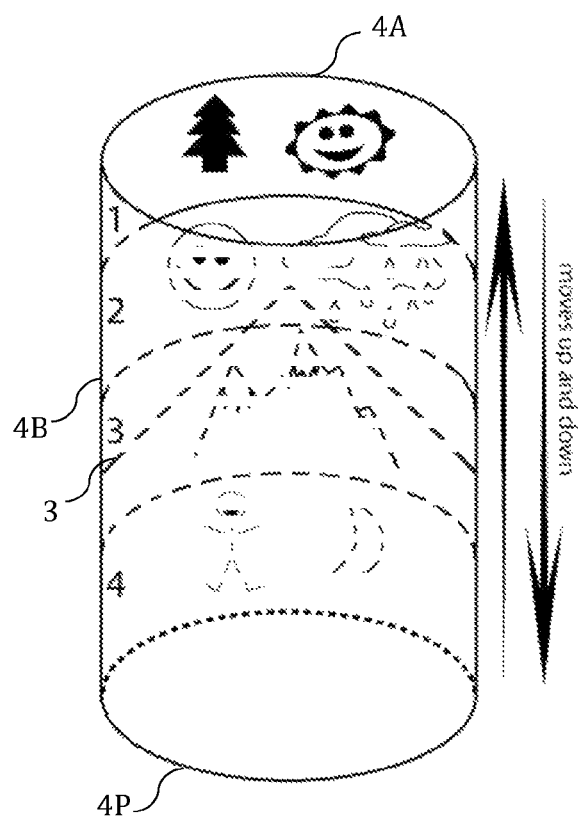

The one or more images in the picture tube can be oriented so that when the picture tube is inserted into the device, the one or more images are oriented toward one the anterior end of the device so that the one or more images are upright when the device is placed on its posterior end as shown in FIGS. 1A and 1B. Where more than one image is presented on the interior longitudinal surface of the device, the images can be of related or unrelated subject matter and can be arranged in any order, one next to the other, along the longitudinal axis of the device. When the images are rotated toward the anterior end of the device and arranged one next to the other along the longitudinal axis of the device, the images become upright and stacked one above the other when the device is placed on its posterior end as illustrated in FIG. 1B. When arranged in this stacked orientation, images nearer the anterior end are displayed before images closer to the posterior end during operation of the optical device. The one or more images can be printed or otherwise formed on a transparent or turbid flat stock material that can be rolled to form the picture tube.

The one or more images can be printed or otherwise formed on a piece of flexible flat stock material that is then rolled to form the picture tube. Where the picture tube has a square, rectangular or n-polygonal cross-section, where n is greater than 2, the one or more images can be printed or otherwise formed on more than one piece of square or rectangular flat stock material that is then combined to form the picture tube. The one or more images can be printed or otherwise formed on the interior side of an elliptical (e.g. circular), or polygonal (e.g. triangular, square or rectangular) picture tube. The one or more images can be printed or otherwise formed on more than one picture tube sections in telescopic arrangement so as to enable extension or contraction of the picture tube as desired. In these embodiments, the picture tube can be composed of 2, 3, 4, 5, 6 or more sections, each adjacent section fitting within the previous section in telescopic alignment, thereby allowing the length of the picture tube to contract or extend as desired.

The one or more images in the picture tube or the picture tube can be replaced or interchanged with other images or picture tubes to display a new or different image. Alternatively, the image or images in the picture tube can be electronically generated, for example, using an electronic image display shaped to fit the contour of the picture tube, thereby allowing the picture tube to be loaded with different sets of images including still frames or video animations.

The picture tube can be made of any convenient transparent or non transparent, flexible or inflexible material including, without limitation, paper, plastic film or foil, canvas, textile, fabric, parchment, wood, release liner, glass, metal, a synthetic or semi-synthetic moldable organic solid such as an elastomer as well as a thermoplastic or thermosetting polymer, or any combination thereof. The picture tube can be made of any material described below for the outer sleeve and imaging assembly.

The picture tube can also include one or more light source as described below and shown in FIGS. 5D and 5F. Where an outer sleeve is employed in a device of the invention, the outer surfaces of the picture tube can be lined with a material such as felt to facilitate longitudinal movement of the picture tube relative to the outer sleeve. Alternatively, the outer surface of the picture tube can include threads that complement a threaded outer sleeve to facilitate smooth gradual longitudinal movement.

Imaging Assembly

The optical device of the invention includes an imaging assembly for reflecting one or more images on the picture tube so as to be viewable from the anterior or viewing end of the device. The imaging assembly includes a mirrored member, an anchor member for positioning the imaging assembly in the device, optionally, a light source and, optionally, a power source and optionally an assembly base cover.

The mirrored member has a reflecting surface oriented toward the anterior end of the device, the mirrored member and the section of the picture tube that is forwardly of the reflecting surface forming a viewing chamber in the anterior end of the device. The reflecting surface of the mirrored member reflects one or more images on the picture tube that is forwardly of the mirrored member thereby enabling the one or more images to be viewable from the anterior end of the device.

Figure 2A:
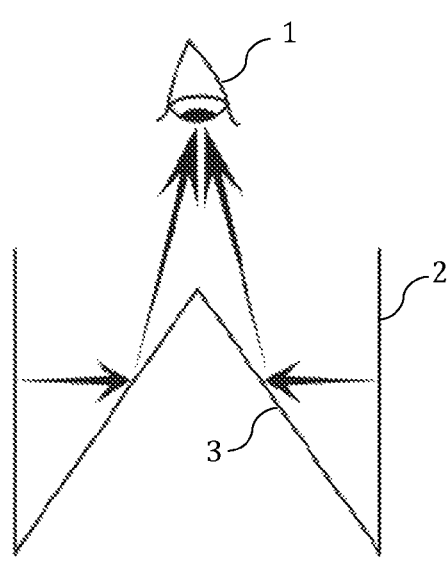
FIGS. 2A-2D illustrate the orientation of various mirrored members relative to the picture tube based on a cross-sectional view of a conical, planar and parabolic mirrored member (2A, 2B & 2C), and based on a perspective view of a pyramidal mirrored member (2D).
Figure 2B:
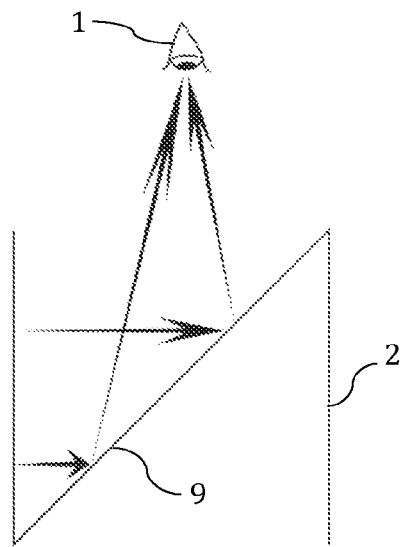
Figure 2C:
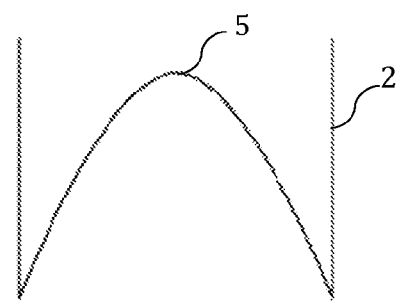

The mirrored member can have a planar structure, for example, a flat mirror with an elliptical or polygonal edge as shown in FIG. 2C. In these embodiments, the reflecting surface is planar. The mirrored member can have a convexoconcaved structure in which the convex bulge extends towards the anterior end of the device as shown in FIGS. 2A-2D. In these embodiments, the reflecting surface is convex. The mirrored member can have a right or oblique conical structure, i.e., the structure formed by the lateral surface of a right or oblique cone that has a round, elliptical or polygonal base. Where the mirrored member has the structure of a circular cone, the reflecting surface can be the lateral surface of the cone. Where mirrored member has the structure of a polygonal cone, the three or more lateral sides of the cone form the reflecting surface of the mirrored member (FIGS. 4B-4D). Thus, where the mirrored member has a pyramidal structure, the four lateral sides of the pyramid form the reflecting surface of the mirrored member (FIG. 4B). Where the mirrored member has a right or oblique conical structure, the apex of the mirrored member can be pointed or rounded (FIGS. 2A and 2B, respectively). Alternatively, the mirrored member can have a frustoconical shape in which the reflecting surface of the mirrored member correspond to the lateral surface of a right or oblique cone in which the apex has been removed (FIGS. 14A-14D). The reflecting surface of the mirrored member can be oriented toward the anterior end of the device at any angle less than 90° relative to cross-sectional plane of the picture tube. For example, and without limitation, the reflecting surface of the mirrored member can be oriented about 5°, about 10°, about 15°, about 20°, about 25°, about 30°, about 35°, about 40°, about 45°, about 50°, about 55°, about 60°, about 65°, about 70°, about 75°, about 80°, about 85° or more than about 85° relative to the cross-sectional plane of the picture tube.

Figure 10A:
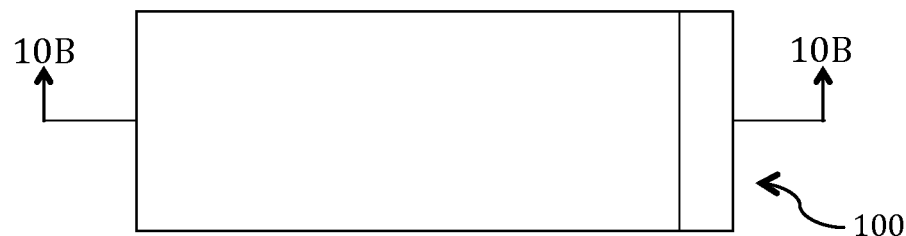
FIGS. 10A-10B are two views of an optical device of the invention including a side view (10A) and a sectional view along lines 10B-10B (10B).
Figure 10B:
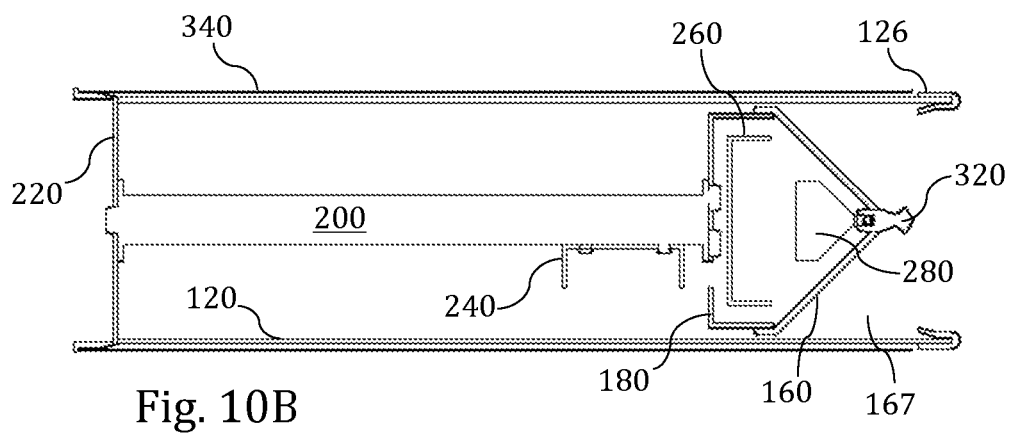

The imaging assembly can optionally include a light source such as a light emitting diode (LED), optionally a light pipe, and optionally, a power source for the LED (FIG. 10B). Where the imaging assembly includes a light source, the light source can be placed on the posterior side of the mirrored member, and a light pipe can be used to transmit the light from the posterior side of the mirrored member to the anterior side so as to provide illumination for the one or more images reflected by the mirrored member. For example, where the mirrored member has frustoconical shape, the light pipe can be placed at the position of the apex, passing from one side of the mirrored member to the other to transmit light from the posterior side of the mirrored member to the anterior side. The light pipe can be a solid of any shape that allows it to be securely inserted through the apical opening of the mirrored member. The light pipe can include a narrower mid-section adjoining an upper section and lower base section, the narrower mid-section having a circumference that fits within the apical opening of the mirrored member. The lower base section of the light pipe is positioned on the posterior side of the mirrored member and includes an opening to accommodate the light source. The lower base section can be tapered as needed to facilitate insertion into the apical opening. The upper section of the light pipe can include a conical cap with a lateral surface that is internally reflective. As such, the internally reflective lateral surface of the conical cap reflects light transmitted from the base of the light pipe laterally to the one or more images on the picture tube and illuminating the viewing chamber of the device. The internally reflective lateral surface of the conical cap can be oriented at any angle less than 90° relative to the base of the conical cap, for example, at about 30°, to facilitate illumination.

Figure 23A:
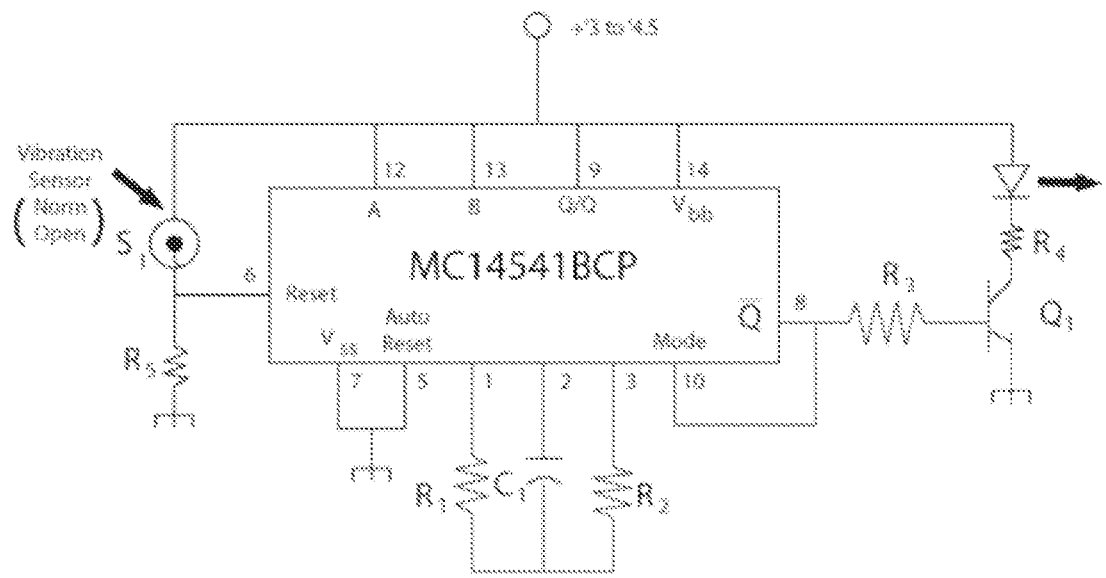
FIGS. 23A-23B are illustrations of the circuit coupling a light source to its power source including a circuit diagram (23A) and a circuit board design (23B). P1 is the power supply (4.5 volts). The square box on P1 indicates positive voltage on the power supply, the round box is negative. D1 connects to the LED (light emitting diode). The square box on D1 connects to the LED base. VS is a vibration sensor.
Figure 23B:
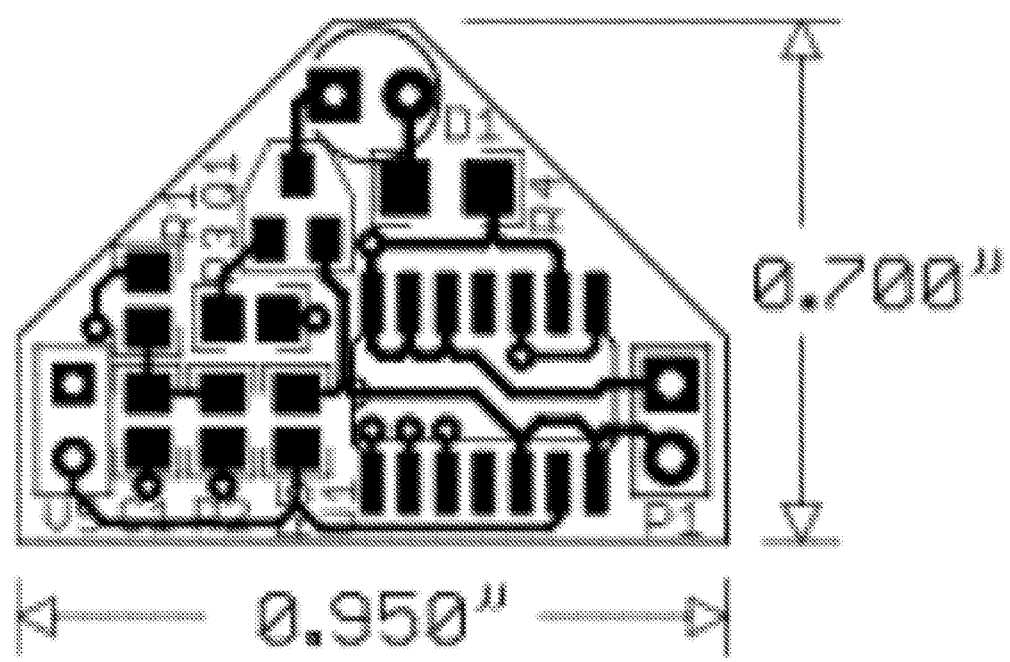

Adjoining the narrower mid-section, the upper section of the light pipe can include a rising taper, for example, a taper of about 60 degrees from the cross-sectional plane of the light pipe, that narrows to a constriction, the taper section adjoining an outwardly flared section below the conical cap. The rising taper allows light from the base of the pipe to be internally reflected upward to the conical cap, while the adjoining outward flare allows light reflecting off the conical cap to be transmitted laterally into the viewing chamber and onto the one or more images on the picture tube thereby illuminating the viewing chamber without affecting negatively affecting the viewer's ability to see the images (FIG. 13).

Where a light source is included, the light source can be powered using one or more batteries as known to those of skill in the art. For example, an LED can be operably connected to one or more batteries through a circuit board as shown in FIGS. 23A and 23B.

Figures 11A, 11B:
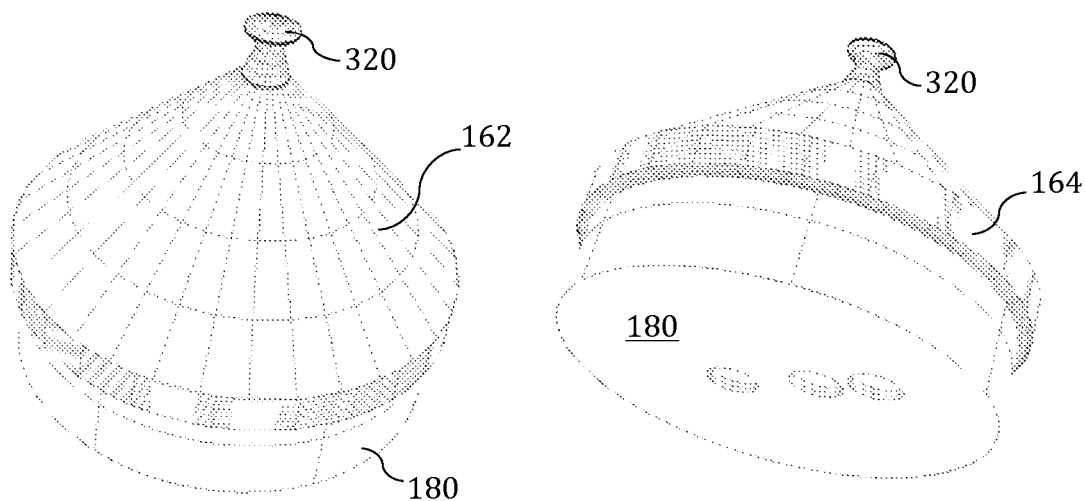

The imaging assembly can also include an assembly base effective to mate with the mirrored member to form a cavity within which the light source, base of the light pipe, battery and circuit board can be enclosed (FIGS. 11A-11D). The assembly base can be secured to the mirrored member through any mechanism known to those of skill in the art including, without limitation, friction, complementary threads, one or more screws, pins or rivets or a snap fit mechanism. For example, the mirrored member can include a peripheral flange defining an opening through which the rim of the assembly base can be inserted and held in place through fiction as shown in FIG. 11D. The peripheral flange and rim can be attached through complementary threads, one or more screws or pins or a snap fit mechanism. Any snap fit mechanism known to those of skill in the art can be employed secure the assembly base to the mirrored member. The snap fit joint can be annular, cantilever, torsional, or U-shaped, as known to those of skill in the art.

The imaging assembly can also include an anchor member for securing the imaging assembly to the device thereby allowing the imaging assembly to maintain position and alignment within the device (FIGS. 9A-9C, FIGS. 10A-10B). The anchor member can be attached to the mirrored member or assembly base on one end and to outer sleeve of the device on the other end, e.g. through a posterior cover. The anchor member can be attached to the mirrored member, assembly base or posterior cover of the device using any means known to those of skill in the art including, without limitation, using a snap fit mechanism as discussed above, through complementary threads, using one or more fasteners such as screws, rivets or pins, using an adhesive, or any combination thereof. For example, the anchor member can include one or more threaded protrusion that can be screwed into one or more openings in the mirrored member, assembly base or posterior cover. Alternatively, the anchor member can be integrally molded to the assembly base and/or to the posterior cover of the device.

The imaging assembly can be made of any materials known to those of skill in the art. The light pipe can be made of any light transmittable material known to those of skill in the art, for example, polycarbonate, styrene, silicone, nylon or another transparent or semi-transparent material. The internally reflecting lateral surface of the conical cap can be formed as described for the reflecting surface of the mirrored member. The mirrored member can be made of a rigid substrate such as paper or plastic on which a metal such as silver, aluminum or mercury can be applied to generate the reflecting surface. Other materials used in preparing the reflecting surface includes, for example, tin chloride, a chemical activator, copper, paint or a combination thereof. The substrate of the mirrored member, as well as assembly base and anchor member can be made of any rigid materials known to those of skill in the art including, without limitation, paper, wood, metal, synthetic or semi-synthetic moldable organic solids such as elastomers as well as thermoplastics or thermosetting polymers. Examples include, without limitation, thermoplastics such as polyester resin, acetal resin, nylon resin and other thermoplastics such as acetals. Additional examples include: ultra-high-molecular-weight polyethylene (UHMWPE), Nylon 6, Nylon 6-6, polytetrafluoroethylene (PTFE/Teflon), acrylonitrile butadiene styrene (ABS), polycarbonates (PC), polyamides (PA), polybutylene terephthalate (PBT), polyethylene terephthalate (PET), polyphenylene oxide (PPO), polysulphone (PSU), polyetherketone (PEK), polyetheretherketone (PEEK), polyimides, polyphenylene sulfide (PPS), polyoxymethylene plastic (POM/Acetal), high-density polyethylene, polyvinyl chloride, low-density polyethylene, polypropylene, polyamides, acrylonitrile butadiene styrene, polycarbonate/acrylonitrile butadiene styrene, and polyetheretherketone. The substrate of the mirrored member, assembly base, anchor member and posterior cover can be made using any process known to those of skill in the art including using injection molding. For example, the substrate of the mirrored member, the assembly base, anchor member and posterior cover can be integrally molded.

Outer Sleeve

The optical device of the invention can optionally include an outer sleeve enclosing the picture tube and imaging assembly. The outer sleeve can have any exterior shape or dimension so long as the interior cavity accommodates an imaging assembly and a picture tube inserted between the imaging assembly and the interior surfaces of the outer sleeve in a manner allowing the picture tube and outer sleeve to slide relative to each other. In general, the interior cavity of the outer sleeve is smooth and has a cross-section sufficient to accommodate the picture tube and imaging assembly so as to allow the picture tube to maintain slidable contact with the outer sleeve. For example, where the imaging assembly has the structure of a circular cone, the internal cavity has a circular cross-section at least the size of the base of the cone and surrounding picture tube. Where the imaging assembly has the structure of a polygonal cone, the internal cavity has a cross-section at least the size of the base of the polygonal cone and surrounding picture tube. As such, the picture is inserted into the cavity formed by the body of the outer sleeve and disposed between the imaging assembly and the interior surface of the outer sleeve, the outer surfaces of the picture tube being in slidable contact with the interior surface of the outer sleeve. The term "slideable contact," as used herein in reference to the picture tube and outer sleeve, means contact in a manner allowing the contacting surface to move in opposite directions. Thus, the picture tube is in slidable contact with the outer sleeve where it can be smoothly inserted into the outer sleeve or smoothly drawn out of the outer sleeve, the outer surface of the picture tube remaining in contact with the interior surface of the outer sleeve.

Thus, the interior cavity of the outer sleeve can be cylindrical with a curved lateral wall and a circular or elliptical cross-section. Alternatively, the interior cavity can have three or more parallel sides, each having the shape of a parallelogram, e.g. a square or rectangle. In these embodiments, the interior cavity of the outer sleeve has an n-polygonal cross-section wherein n can be any integer greater than 2. Thus, the interior cavity can have the structure of a right or oblique, geometric prism with an elliptical or n-sided polygonal cross-section, wherein n can be any integer greater than 2, such as, for example, a triangular, quadrilateral, pentagonal, hexagonal, heptagonal, octagonal, nonagonal, decagonal, dodecagonal, circular or oval cross-section.

In some embodiments, the posterior end of the outer sleeve can be closed using a posterior cover to which the anchor member of the assembly is secured as described above. Where a picture sleeve includes a posterior cover, the picture tube and posterior cover can be integrally molded. The anterior end of the outer sleeve can be open or closed. The anterior end of the outer sleeve can include a lens to facilitate viewing of the one or more images in the viewing chamber.

The outer sleeve can be made of a flexible or non-flexible, transparent or non-transparent material as described above for the picture tube or imaging member. Thus, the outer sleeve can be made of any transparent or non transparent material known to those of skill in the art including, for example, paper, wood, plastic, glass, metal, a synthetic or semi-synthetic moldable organic solid such as an elastomer or as well as a thermoplastic or thermosetting polymer, or any combination thereof as described above for the imaging assembly or picture tube. The outer surface of the sleeve can also include the one or more images presented in the picture tube. The outer sleeve can be made of a transparent material thereby allowing light external to the device to be a source of illumination or the outer sleeve can be constructed to include a source of illumination. The outer sleeve can be formed using any process known to those of skill in the art including by injection molding.

Illumination Source, Imaging Lens, Arrays and Other Applications

Where the optical device includes a light source, the light source can be disposed in the cavity of the imaging assembly as discussed above or secured to the base of the mirrored member as shown in FIG. 5C. Other configures for the light source include at the anterior end of the picture tube (FIG. 5B), in the walls of or external to the picture (FIGS. 5D & 5F, respectively), secured to an imaging lens system positioned forwardly of the reflecting surface and oriented into the viewing chamber (FIG. 5E) so as to illuminate the one or more images in the viewing chamber.

Where the optical device includes imaging lens, the imaging lens can be positioned forwardly of the imaging assembly (FIGS. 5E and 6A-6B) and held in place by a frame secured to the imaging assembly so as to maintain a constant position from the reflecting surface.

An optical device of the invention can be any size and can be sized differently for different applications including use in small scale applications such as in a hand-held instrument, a spatial light modulator, in e-paper, or in larger scale applications such as for advertising billboards, street signs or banners. For example, a hand-held optical device of the invention can have a diameter between 70-100 mm. A large device for stereoscope display can have a diameter between 20-40 inches, for example between 24-30. An optical device of the invention can have diameters on the micrometer or nanometer range for smaller scale applications.

In some embodiments, a plurality of optical devices can be assembled in an array to form an image matrix in which each device contains a subdivided display of a larger image. In these embodiments, the optical devices are arranged following their boundary shape so as to achieve the closest geometric packing for its shape. Thus, where the optical device is a square tube, the devices can be arranged along a rectilinear pattern. Each device in the array can be configured to display more than one image, a portion of an image, many image pixels or a single pixel in a composite image observed by the viewer. Devices displaying multiple images can be combined to form an array displaying more than one image by adjusting the relative position of a mirrored member with respect to its picture tube for each device.

Specific embodiments of the invention are described in the following examples, which do not limit the scope of the invention described in the claims.

EXAMPLE

FIG. 1A-1B illustrates the use of an imaging assembly with a convex reflecting surface placed in the cavity of a picture tube to reflect an image on the internal lateral surface of the picture tube. As shown in FIG. 1A, picture tube 2 is cylindrical and includes anterior end 2A, body section 2B with one or more images on its internal lateral surface, and posterior end 2P. The one or more images in picture tube 2 follow the internal circumference of the picture tube. The images can be predistorted, e.g. an anamorphic image. Convex reflecting surface 3 is oriented toward anterior end 2A, i.e. toward observer 1. As such, the one or more images on the internal lateral surface of picture tube 2 are reflected by surface 3 so as to be viewable by an observer at the anterior end. Where picture tube 2 provides a distorted image, e.g. an anomorphic image, the reflected image can be undistorted by convex mirror 3.

Where a picture tube includes more than one image, the two or more images are oriented and stacked as shown in FIG. 1B. The images in picture tube 4 follow the internal circumference of the picture tube, and each image is displayed by reflecting surface 3 as the position of the reflecting surface is moved along the longitudinal axis of the picture tube 4. At discrete positions along the longitudinal axis where an image is aligned with reflecting surface 3, an internally complete image is reflected to an observer at the anterior end. In contrast, at other positions along the longitudinal axis, the observed image is a continuous morphing of two adjacent images. Where picture tube 4 provides a distorted image, e.g. an anomorphic image, the reflected image can be undistorted by reflecting surface 3.

Figure 2D:
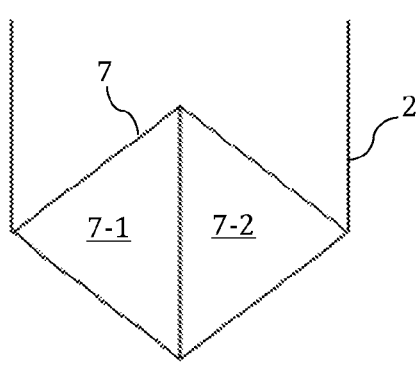
Figure 3:
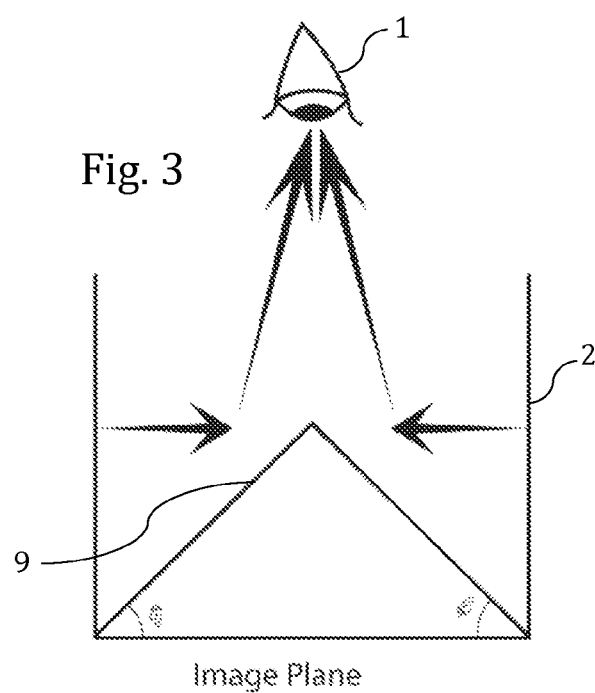
FIG. 3 illustrates an embodiment of the invention in which the mirrored member has a reflecting surface of about 45° relative to the cross-sectional plane of the picture tube.

FIGS. 2A-2D illustrate the various convex mirrors that can be used in an optical device of the invention. FIGS. 2A-2C provide longitudinal sectional views of conical mirror 3 (2A), parabolic mirror 5 (2C) and planar mirror 9 (2B) mirror inserted within picture tube 2. In each case, the reflecting surface is oriented toward the anterior end of picture tube 2, i.e. toward observer 1, at an angle less than 90° degrees relative to the cross-sectional plane of picture tube 2, e.g. 45° (FIG. 3). FIG. 2D provide a perspective view of pyramidal mirror 7 in which the reflecting surface is formed by lateral sides 7-1, 7-2 and 7-3 (not shown).

The picture tube for use in a device of the invention has a cross-sectional opening that complement the widest cross-section of the imaging assembly. Examples of various picture tube structures and the complementary imaging assembly are provided in FIGS. 4A-4D. Picture tube 2, which has a cylindrical cross-sectional opening is used with conical mirror 5, which has a circular base or cross-section (FIG. 4A). Picture tube 8, which has a square cross-sectional opening is used with pyramidal mirror 7, which has a square base and a reflecting surface formed by lateral side 7-1, 7-2, 7-3 and 7-4 (FIG. 4C). Picture tube 14, which has a hexagonal cross-sectional opening is used with hexagonal mirror 13, which has a hexagonal base and a reflecting surface formed by lateral side 13-1, 13-2, 13-3, 13-4, 13-5 and 13-6 (FIG. 4D). Picture tube 12, which has a triangular cross-sectional opening is used with mirror 11, which has a triangular base and a reflecting surface formed by lateral side 11-1, 11-2 and 11-3 (FIG. 4B).

Figure 5A:
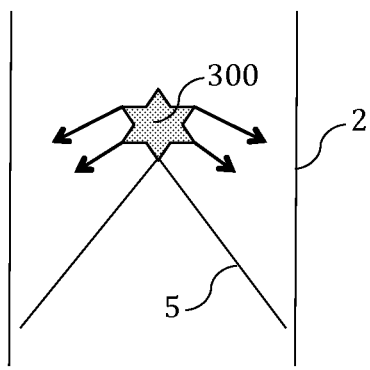
Figure 5B:
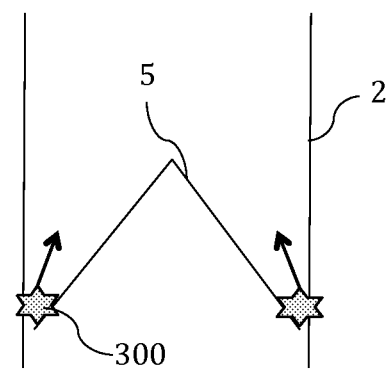

A light source for illuminating the viewing chamber can be placed at various positions in the optical device as shown in FIG. 5A-5F. Light source 300 can be placed at the apex or base of reflecting surface 5 (FIGS. 5A and 5B, respectively), at the anterior end of the picture tube or device (FIG. 5C), from the bottom of an imaging lens system 360 forwardly of the reflecting surface 5 (FIG. 5D), on the exterior side of transparent picture tube 6a (FIG. 5E), or in the thick transparent picture tube 6b (FIG. 5F). In FIG. 5E, the light enters straight through the sides of the picture tube wall, while in 5F, the light is introduced at the base edge of the picture tube wall and then bounces internally multiple times up the transparent wall before shining through the picture tube.

Figures 6A, 6B:
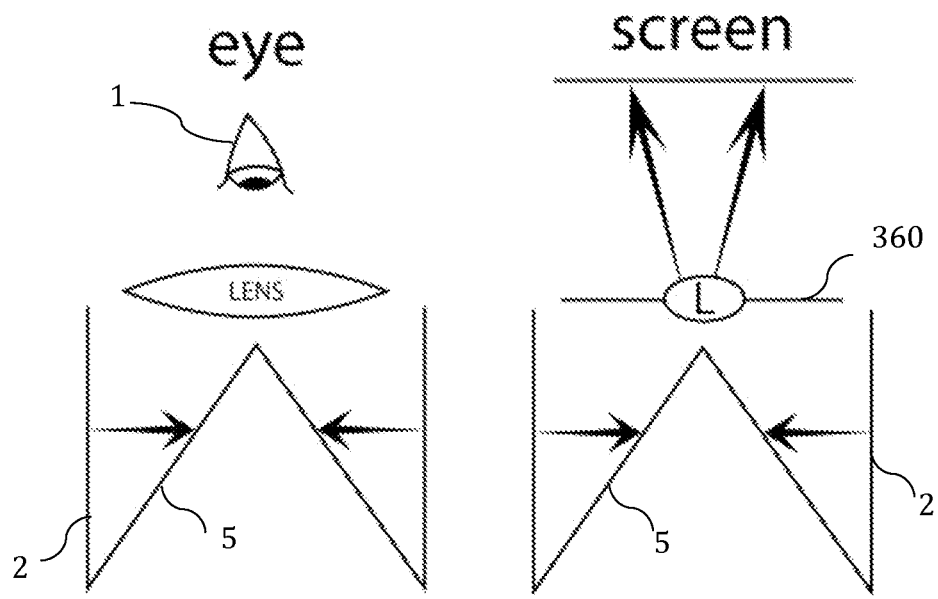
FIGS. 6A-6B illustrate the use of an imaging lens at the anterior end of the optical device to project the image reflected by the mirrored member to an observer's eye (6A) or to an external screen for viewing by one or more observers (6B).

An imaging lens system can be included in the optical device to facilitate viewing. For example, imaging lens 360 is disposed forwardly of reflecting surface 5 as shown in FIG. 6A. Imaging lens 260 can be used to project an image to observer 1 or onto external screen 1S that can be viewed by one or more observer. Imaging lens 360 can be used to increase magnification of the image displayed by the reflecting surface thereby allowing a larger number of images and/or smaller images to be incorporated in the picture tube. For example, a picture tube that can display 1-6 images without imaging lens can display 20-30 images with the use of imaging lens as the size of each image can be reduced thereby enabling a larger number of images on the same size picture tube. The imaging lens system can be secured to the imaging assembly using a frame as shown in FIG. 5D to maintain a constant distance from the mirrored surface.

Figure 7:
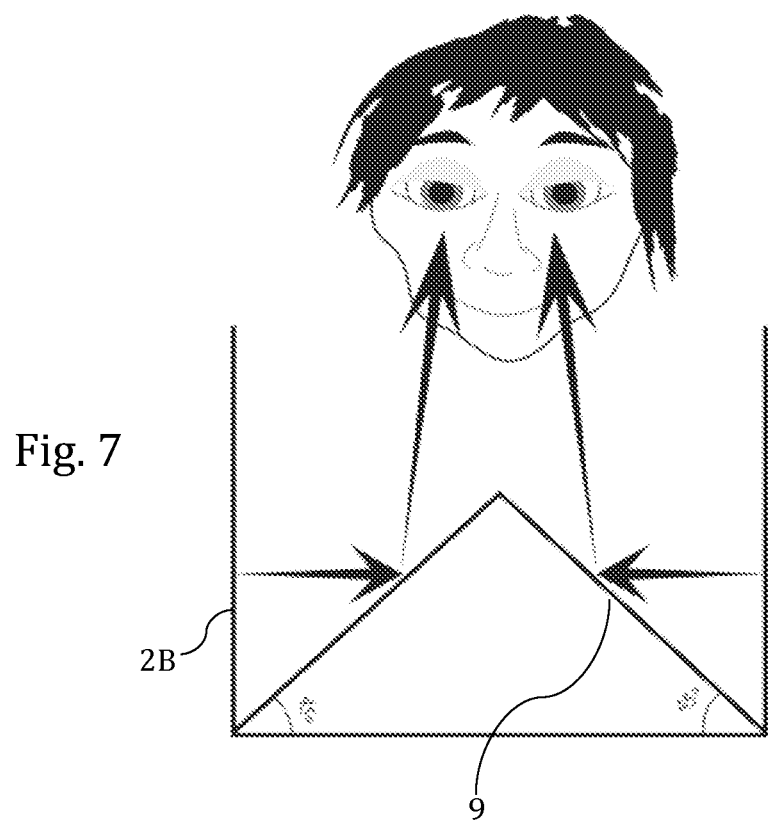
FIG. 7 illustrates use of an optical device of the invention to achieve a stereoscopic, three-dimensional image.

An optical device of the invention can be configured to provide stereoscopic, three-dimensional display (FIG. 7). In these embodiments, to provide a comfortable viewing distance for the observer, the optical device can be configured with a wider diameter, for example, about 24-30 inches. Alternatively, two sets of lenses can be used to increase viewing distance.

An optical device of the invention can also be used in an array format. In these embodiments, a plurality of optical device 100A or 100B arranged in the form of an array as shown in FIGS. 8A and 8B, respectively is used to form an image matrix, in which each device displays a small portion of the larger image. The geometric arrangement of the array follows the boundary shape of each device so as to achieve the closest geometric packing possible. For example, if the optical device has a square shape, the array can be arranged along a rectilinear pattern.

An imaging assembly for use in an optical device of the invention is shown in FIGS. 9A-9D. Two perspective views for imaging assembly 140 are shown in FIGS. 9A-9B. Imaging assembly 140 includes frustoconical mirrored member 160 with light pipe 320 attached to assembly base 180. Anchor member 200 is fastened to assembly base 180 at its anterior end and to posterior cover 220 at its posterior end. Battery box 240 is fastened to the shaft of anchor member 200. FIG. 9C illustrates an assembled optical device 100. The anterior portion of imaging assembly 140, which includes light pipe 320 and frustoconical mirrored member 160, are visible from anterior end 100A of optical device 100.

A side view of optical device 100 having an elongated body is shown in FIG. 10A. A longitudinal sectional view of optical device 100 taken along lines 10B-10B is shown in FIG. 10B. Optical device 100 includes outer sleeve 340 enclosing picture tube 120 and image assembly 140, picture tube 120 being inserted between outer sleeve 340 and imaging assembly 140. Outer sleeve 340 is shown with a smooth body between anterior end 340A and posterior end 340P. Anterior end 340 is open allowing for insertion of picture tube 120 into outer sleeve 340. Posterior end 340P is closed by insertion of posterior cover 220, which has a peripheral edge co-terminal with the opening at posterior end 340P.

Picture tube 120 includes a body section 120 and end ring 126. Picture tube 120 is an elongated tubular structure with a circular cross section and a circumference substantially co-terminus with the interior opening of outer sleeve 340 thereby allowing picture tube 120 to be in slidable contact with the interior surface of outer sleeve 340. The anterior end of picture tube 120 is fitted with end ring 126, which provides structural support as well as a grip for the picture tube.

Imaging assembly 140 includes frustoconical, mirrored member 160 attached to assembly base 180 and anchor member 200, secured to assembly base 180 at its anterior end and to posterior cover 220 at the posterior end. The cavity formed by mirrored member 160 and assembly base 180 houses battery box 260, circuit board 280 and light source 300. Light source 300 is powered using one or more batteries through circuit board 280. Light source 300 is inserted into the base of light pipe 320, which is disposed at the apical opening of mirrored member 160 and acts to transmit light from light source 300 to the viewing chamber 167. The one or more batteries are housed in battery box 260, located within assembly cavity 165 or in battery box 240 fastened to the shaft of anchor member 200. Anchor member 200 is secured to base posterior cover 220, as well as to the posterior opening of outer sleeve 340.

Anterior and posterior perspective views, respectively, of the imaging assembly without the anchor member is shown in FIGS. 11A-11B. The subassembly includes frustoconical mirrored member 160 with reflecting surface 162, peripheral flange 164 and light pipe 320 attached to assembly base 180. Assembly base 180 includes three openings for mating with the anterior end of anchor member 200 and for electrical wires connecting circuit board 280 and to one or more batteries in battery box 240. FIG. 11C provides a top view of frusto-conical mirrored member 160 with reflecting surface 162 and light pipe 320, and FIG. 11D is a sectional view along line 11D-11D of the sub-assembly as disposed within an optical device of the invention. As shown in FIG. 11D, frustoconical mirrored member 160 and assembly base 180 form a cavity that houses battery box 260, circuit board 280, light source 300 and base of light pipe 320. Light pipe 320, disposed in the apical opening of frustoconical mirrored member 160, includes an opening at its base for receiving light source 300. Anchor member 200 is secured to assembly base 180 through two openings in base 180. Peripheral flange 164 (see FIG. 14D) of mirrored member 160 is parallel to the interior surface of picture tube 120 (FIG. 11D). Peripheral flange 164 defines an opening that is co-extensive with the peripheral edge of assembly base 180 thereby allowing assembly base 180 to be snuggly inserted into the opening defined by peripheral flange 164.

Light pipe 320 is shown in FIGS. 12A-12E. FIGS. 12A-12D provide various perspective views including a side perspective view (12A), a bottom perspective view (12B), a side view (12C), a sectional view along line 12D-12D (12D), and an enlarged sectional view of the base of light pipe 320 with light source 300 and circuit board 280 attached (12E). Light pipe 320 includes base section 322 adjoining narrow mid-section 324, which adjoins upwardly tapering section 326 with constriction 327 adjoining a flared section 328. Flared section 328 adjoins cone base 330, which adjoins conical section 332 having an internally-reflecting lateral surface. Sectional view of light pipe 320 provided in FIG. 12D shows a solid structure with opening 321 at base 322 for receiving a light source and conical section 332 with an internally-reflecting lateral surface oriented at about 30° relative to the cross-sectional plane of light pipe 320. FIG. 12F is an enlarged view of light pipe base 322 with a light emitting diode 300 inserted in opening 321. FIG. 13 illustrates the path of light emitting by light source 300. Light from light source 300 is transmitted upwards, internally reflected up to conical section, where it reflects of internally reflecting surface 332 and then is transmitted out through section 328 to the viewing chamber 167. In sum, light pipe 320 has a solid structure made of transparent plastic (e.g. polycarbonate or clear styrene.) and a base with an opening to accommodate a light source. The structure of light pipe 320, in particular, rising taper 326 is angled so that most of the light is internally reflected, i.e. is reflected up to conical section 332, which has a lateral surface that is internally reflecting. That is, the internal lateral surface of conical section 332 is reflectorized with a mirrored coating (e.g. metallic silver or aluminum) to reflect light toward the outwardly flared section 328. As such light reflecting from conical section 332 is transmitted out of light pipe 320 and into the viewing chamber 167 by refraction through outwardly flared section 328, section 328 functioning as a negative lens thereby causing the light to diverge and expand outward. This allows most of the light from light pipe 320 to pass directly to the sides of the picture tube first before reflecting off the mirrored member 160.

Figure 14A:
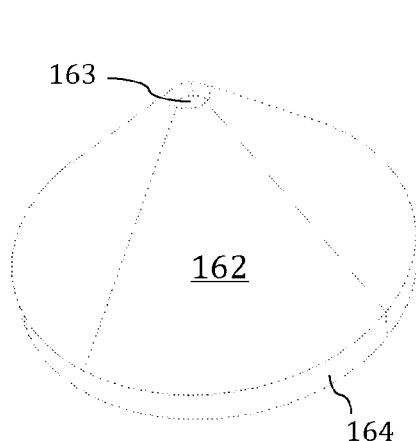
FIGS. 14A-14D are various views of a frustoconical mirrored member including: an anterior perspective view (14A), a posterior perspective views (14B), a top view (14C) and a sectional view along lines 14D-14D (14D).
Figure 14B:
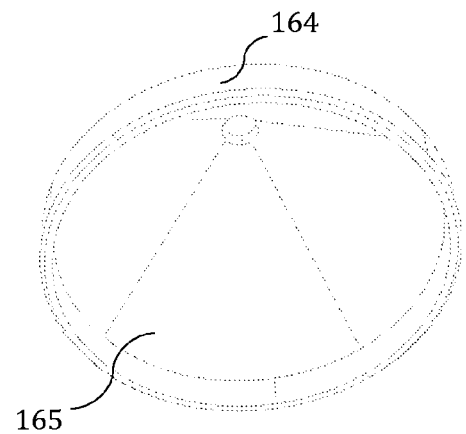
Figure 14C:
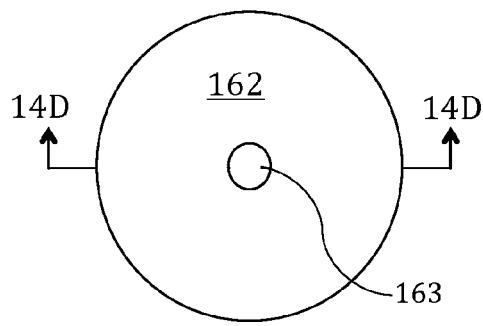
Figure 14D:
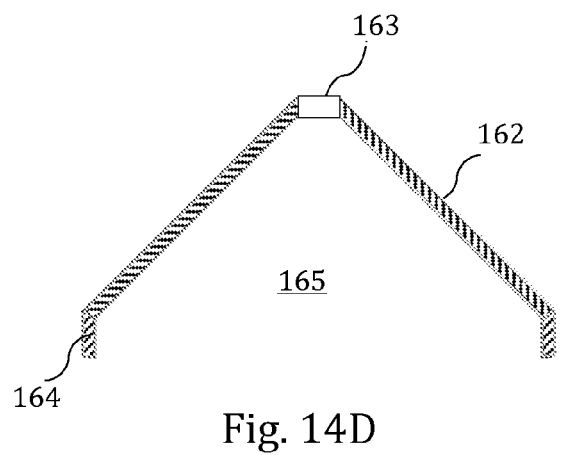
Figure 15A:
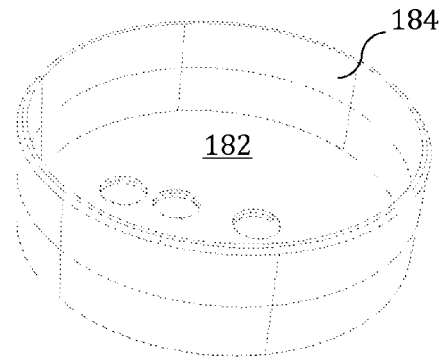
Figure 15B:
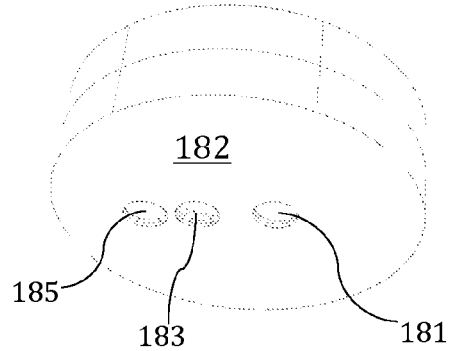
Figure 16C:
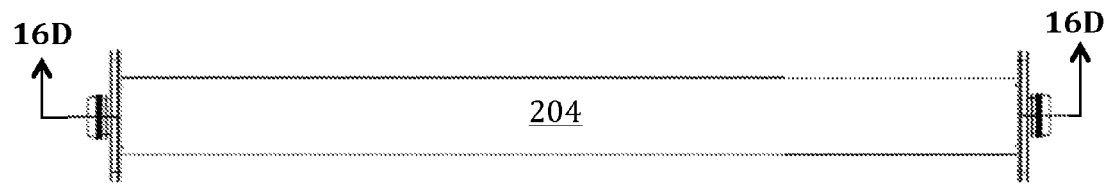
Figure 16D:
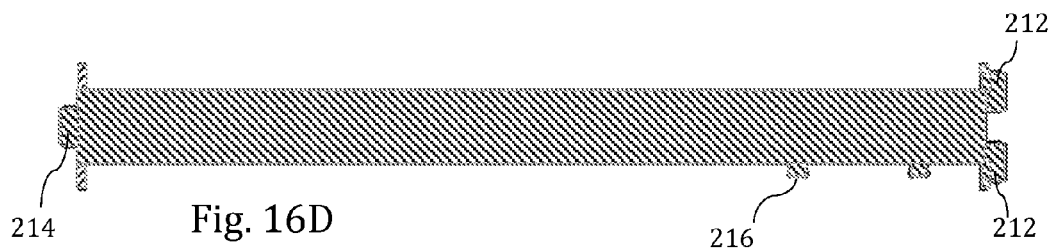
Figure 16E:
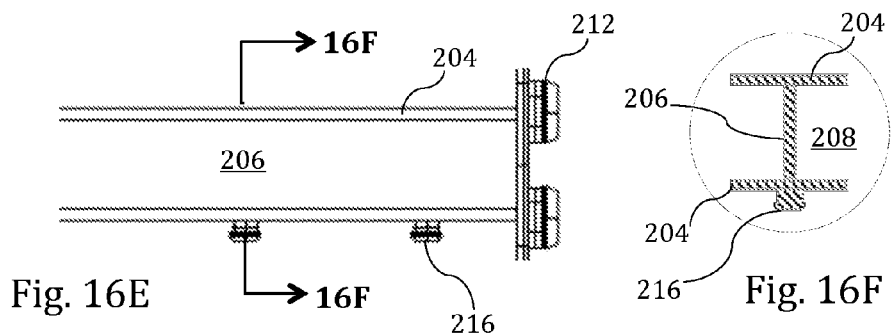
Figure 16F:
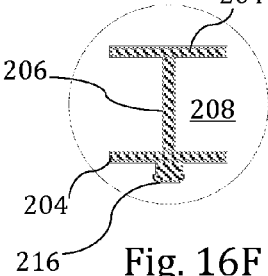

Frustoconical mirrored member 160 is illustrated in FIGS. 14A-14D. Anterior and posterior view are provided in FIGS. 14A and 14B, respectively. Frustoconical mirrored member 160 has reflecting surface 162, apical opening 163, peripheral flange 164 and posterior cavity 165. Top view of mirrored member 160 with reflecting surface 162 and apical opening 163 is shown in FIG. 14C, and a sectional view along line 14D-14D is shown in FIG. 14D.

Imaging assembly base 180 is illustrated in FIGS. 15A-15D. Anterior and posterior views are provided in FIGS. 15A and 15B, respectively. Assembly base 180 has base 182, lateral side 184, opening 181 and 183 for securing anchor member 200 to assembly base 180 and opening 185 for electrical wiring. A top view of assembly base 180 is provided in FIG. 15C, and a sectional view along line 15D-15D showing opening 181, 183 and 185 is provided in FIG. 15D.

Anchor member 200 is illustrated in FIGS. 16A-16F. Posterior and anterior perspective views are provided in FIGS. 16A and 16B, respectively. Anchor member 200 is composed of H-shape body 202 terminating in anterior flange 208 and posterior flange 210. H-shape body 202 is composed of side 204 and bridge 206 with protrusions 216 for fastening a battery box. Anterior flange 208 includes protrusion 212 for mating with openings 181 and 183 in base 182 of assembly base 180. Posterior flange 210 include fastening means 214 for securing the posterior end of anchor member 200 to base cover 220.

Posterior cover 220 is illustrated in FIGS. 17A-17D. Posterior and anterior perspective views are provided in FIGS. 17A and 17B, respectively. FIG. 17C provide a top view of posterior cover 220, which includes base section 222, tapered side 224 with opening 223 for fastening to anchor member 200. A sectional view showing tapered lateral side 224 and peripheral flange 226 is provided in FIG. 17D.

Picture tube 120 is illustrated in FIGS. 18A-18C. FIGS. 18A and 18B provide a side perspective view and a side view, respectively, showing picture tube 120 with cylindrical body section 120B and end ring 126. FIG. 18C provides a longitudinal sectional view along line 18C-18C.

End ring 126 is illustrated in FIGS. 19A-19D. An anterior and posterior perspective views are provided in FIGS. 19A and 19B, respectively, and a top view is provided in FIG. 19C. End ring 126 has a circular trough structure with groove 126G formed by circular side 126I and 126O for receiving the anterior end of picture tube 120 as shown in the sectional view of FIG. 19D.

Figure 20A:
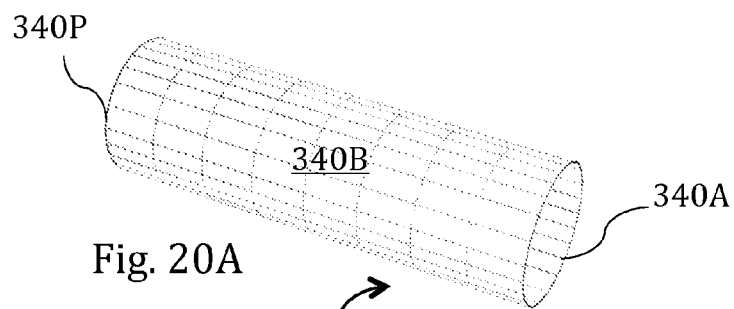
FIGS. 20A-20C are various views of the outer sleeve including: a side perspective view (20A), a side view (20B) and a sectional view along line 20C-20C (20C).
Figure 20B:
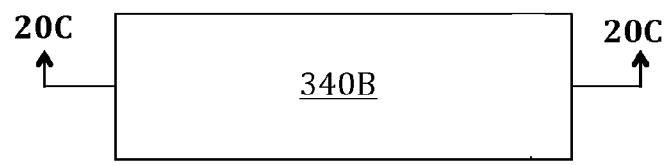
Figure 20C:
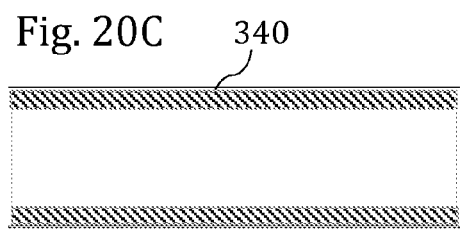

Outer sleeve 340 is illustrated in FIGS. 20A-20C. Outer sleeve 340 has cylindrical body section 340B with an interior cavity, as well as anterior end 340A and posterior end 340P as illustrated in FIG. 20A (side perspective view), FIG. 20B (side view) and FIG. 20C (longitudinal sectional view).

Figure 21A:
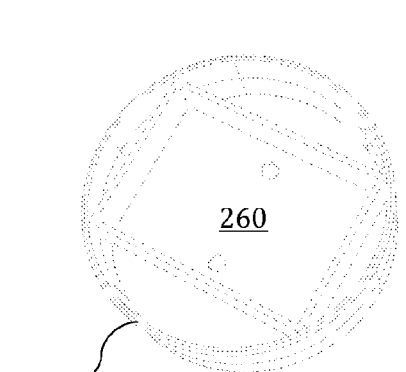
Figure 21B:
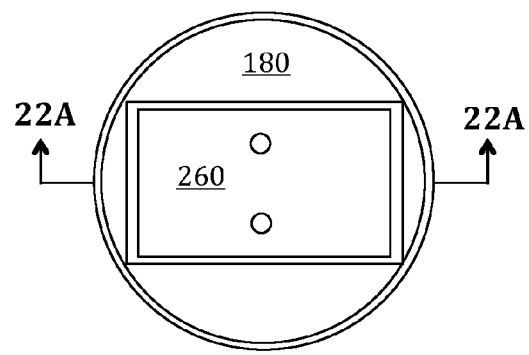

Battery box 240 and battery box 260 are attached to imaging assembly 140 as shown in FIGS. 21A-21D. Battery box 260 is situated within assembly base 180 as shown in FIG. 21A (top perspective view), FIG. 21B (top view) and FIG. 22A (sectional view along line 22A-22A). Battery box 240 is mounted to the side of anchor member 200 using fastener 216 as shown in FIG. 21C (perspective view), FIG. 21D (side view) and FIG. 22B (sectional view along line 22B-22B). Opening 185 allow for passage of electrical wiring between one or more batteries in battery box 240 and circuit board 280.

Figure 24A:
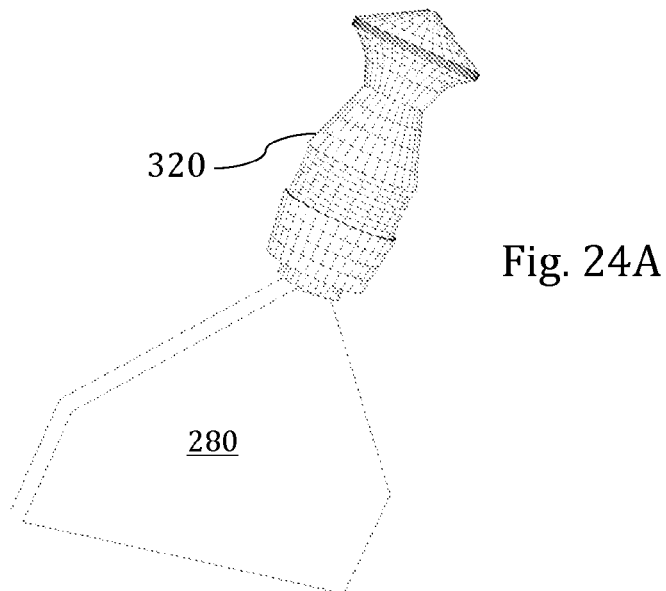
FIGS. 24A-24C are views of an LED, light pipe and circuit sub-assembly including a perspective view (24A), a top view (24B) and sectional view along line 24C-24C (24C).
Figure 24B:
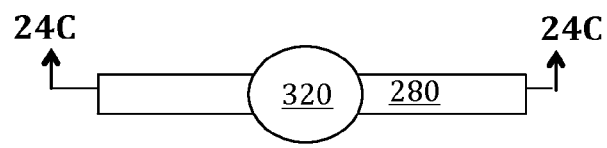
Figure 24C:
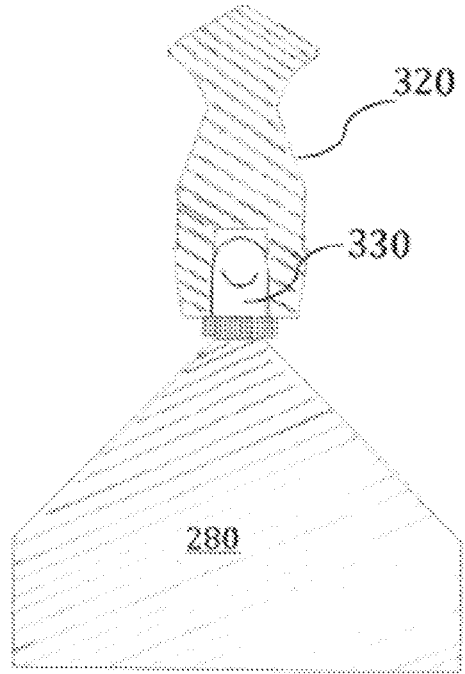

Circuit board 280, illustrated in FIGS. 23A and 23B, includes a vibration sensor (S in FIG. 23A, VS in FIG. 23B) that allows the light source to be turned on in response to vibration or movement of the optical device. Circuit board 280 is operably connected to light source 300 and light pipe 320 as shown in FIGS. 24A (perspective view), 24B (top view) and 24C (sectional view). A power supply (P1) of 4.5 volts is used to power the light source, e.g. LED, which is connected to circuit board 280 via D1. Vibration sensor is used to turn on the light source. When the vibration sensor is activated, the LED light is switch on and the timer begins counting down for approximately one minute. If at any time during this period the vibration sensor is activated again, the timer is reset for an additional duration of the one minute. Once the timer reaches zero (after the one minute duration), the LED light is turned off until the vibration sensor is activated again.

Figure 25A:
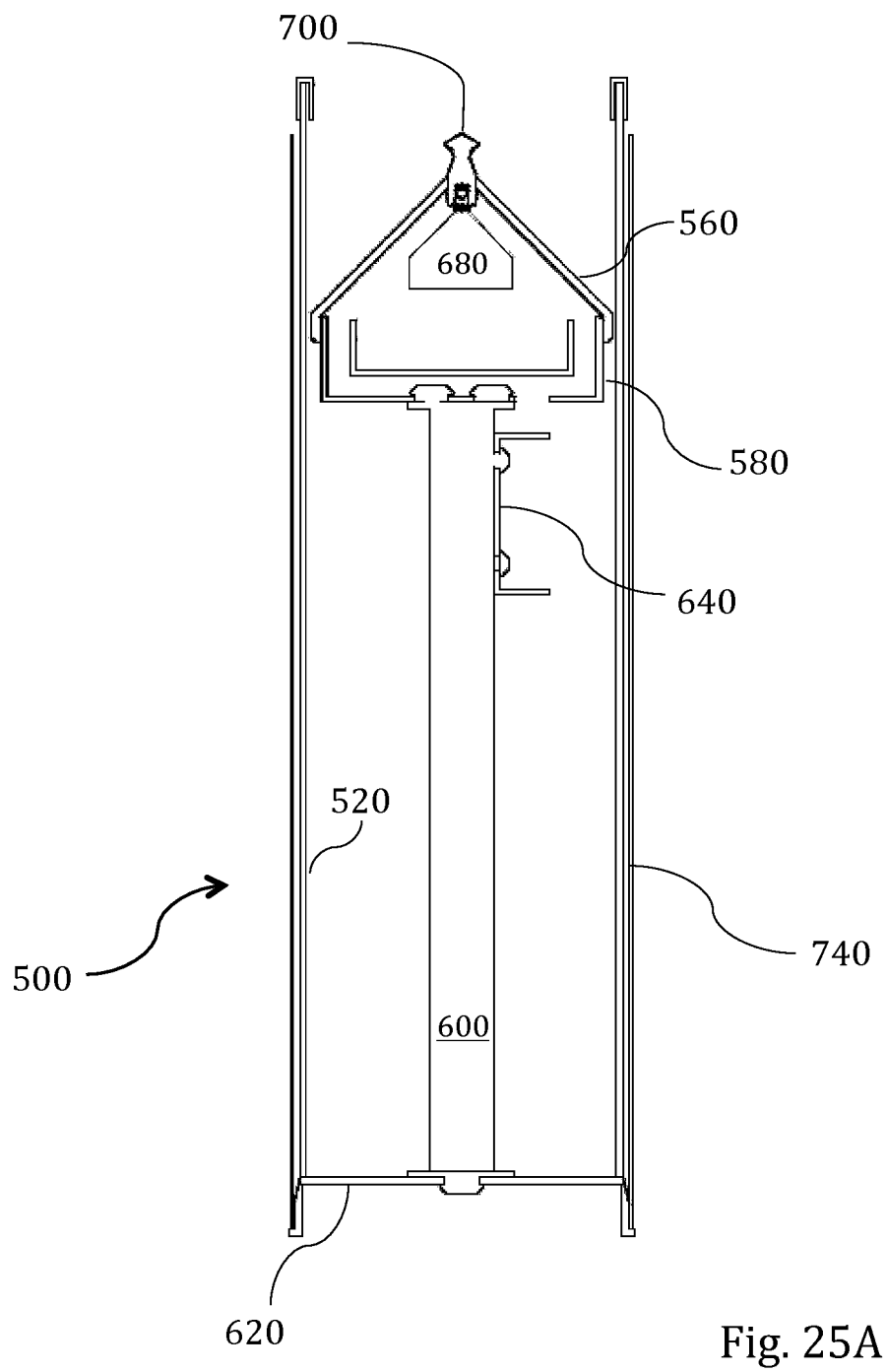
FIGS. 25A-25N illustrate optical device 500 and its components.
Figure 25B:
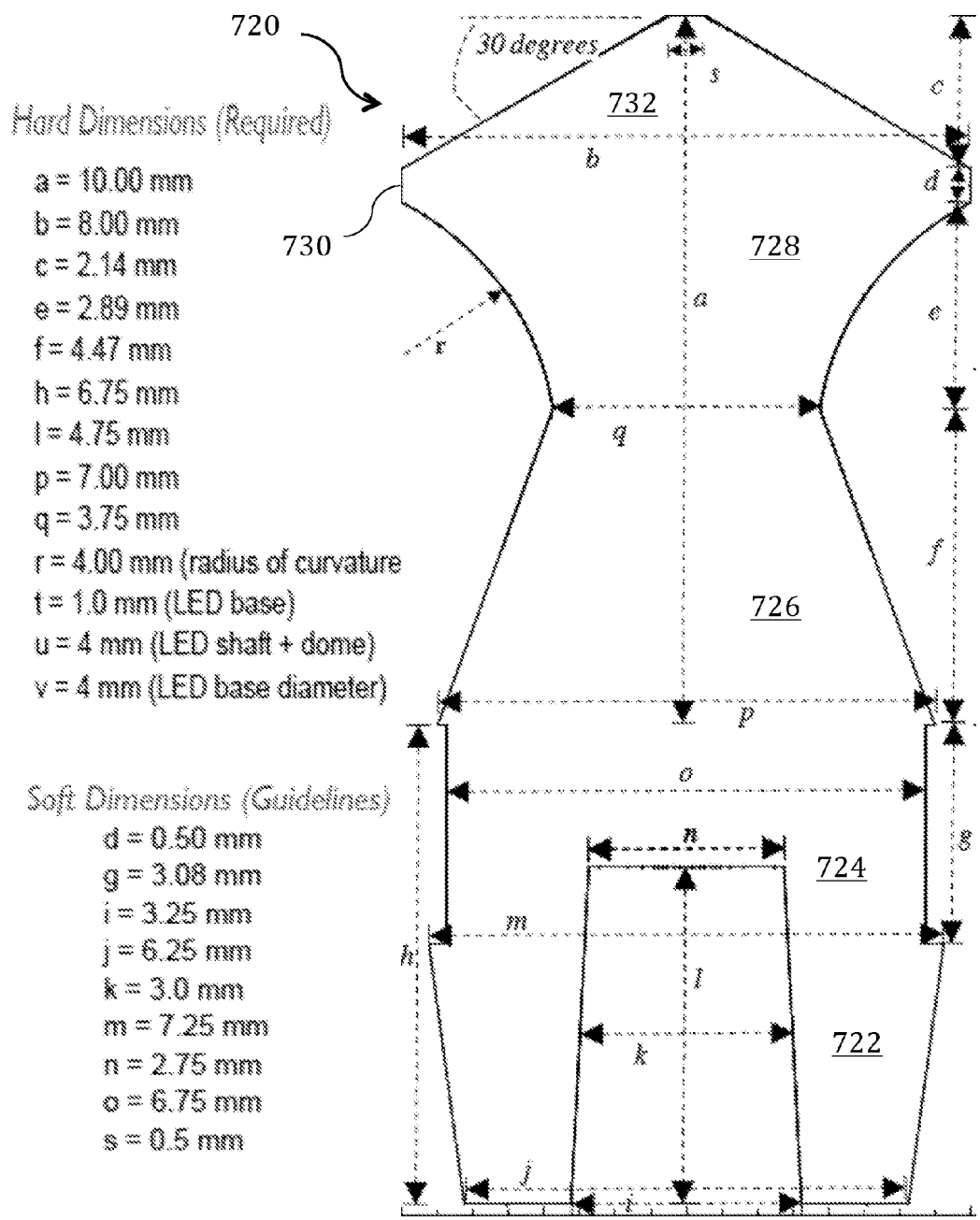
Figure 25E:
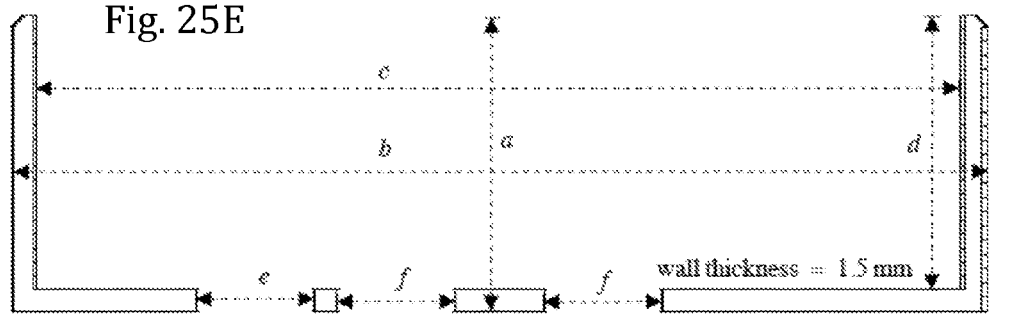
Figure 25F:
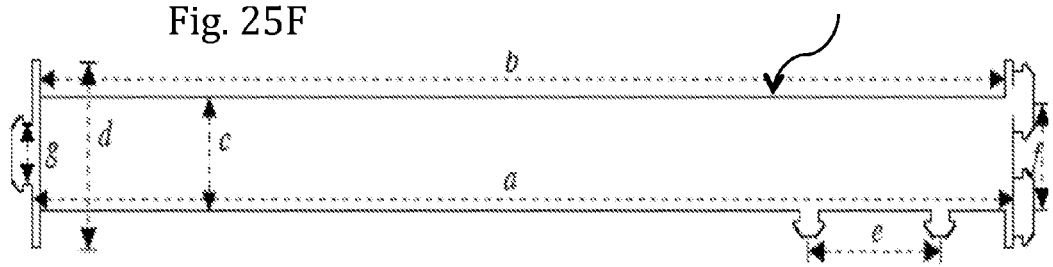
Figure 25G:
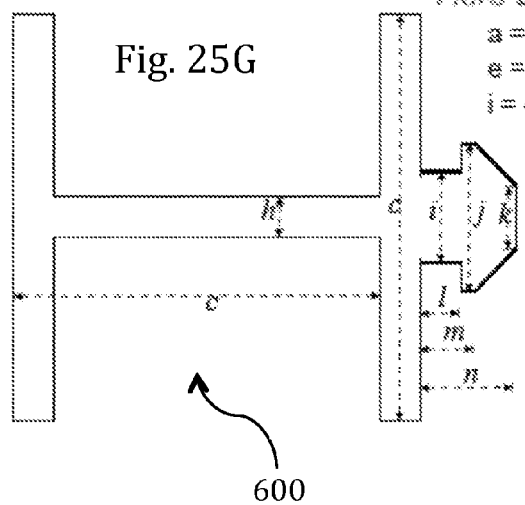
Figure 25L:
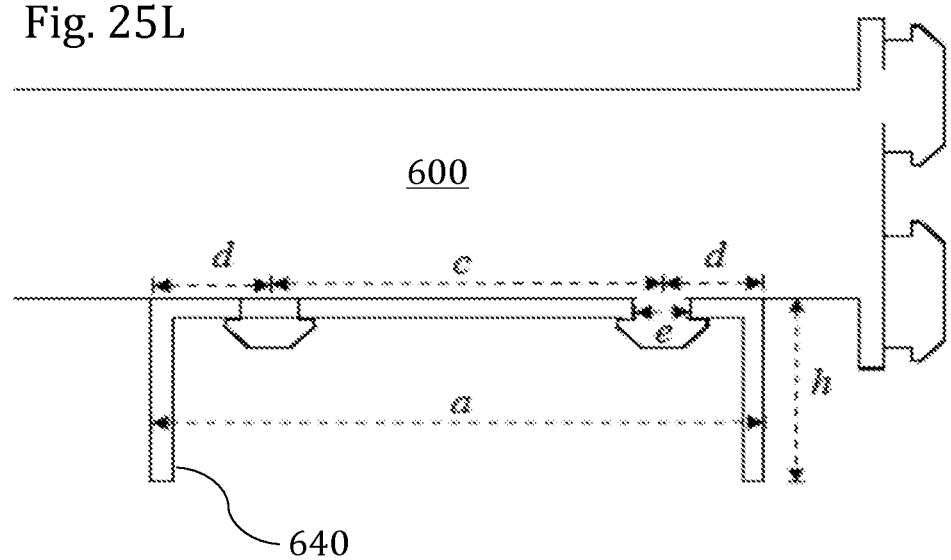
Figure 25M:
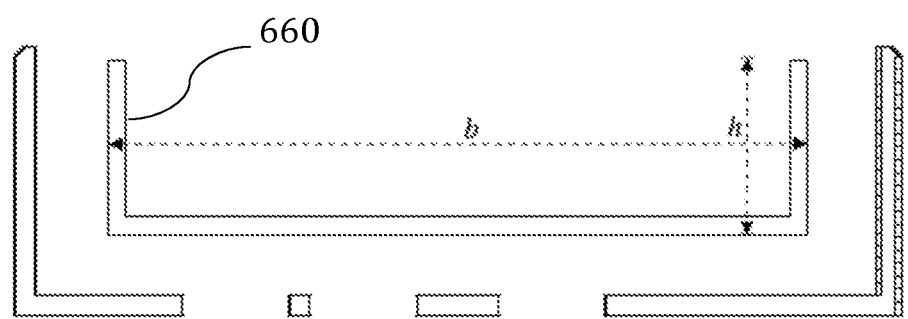
Figure 25N:
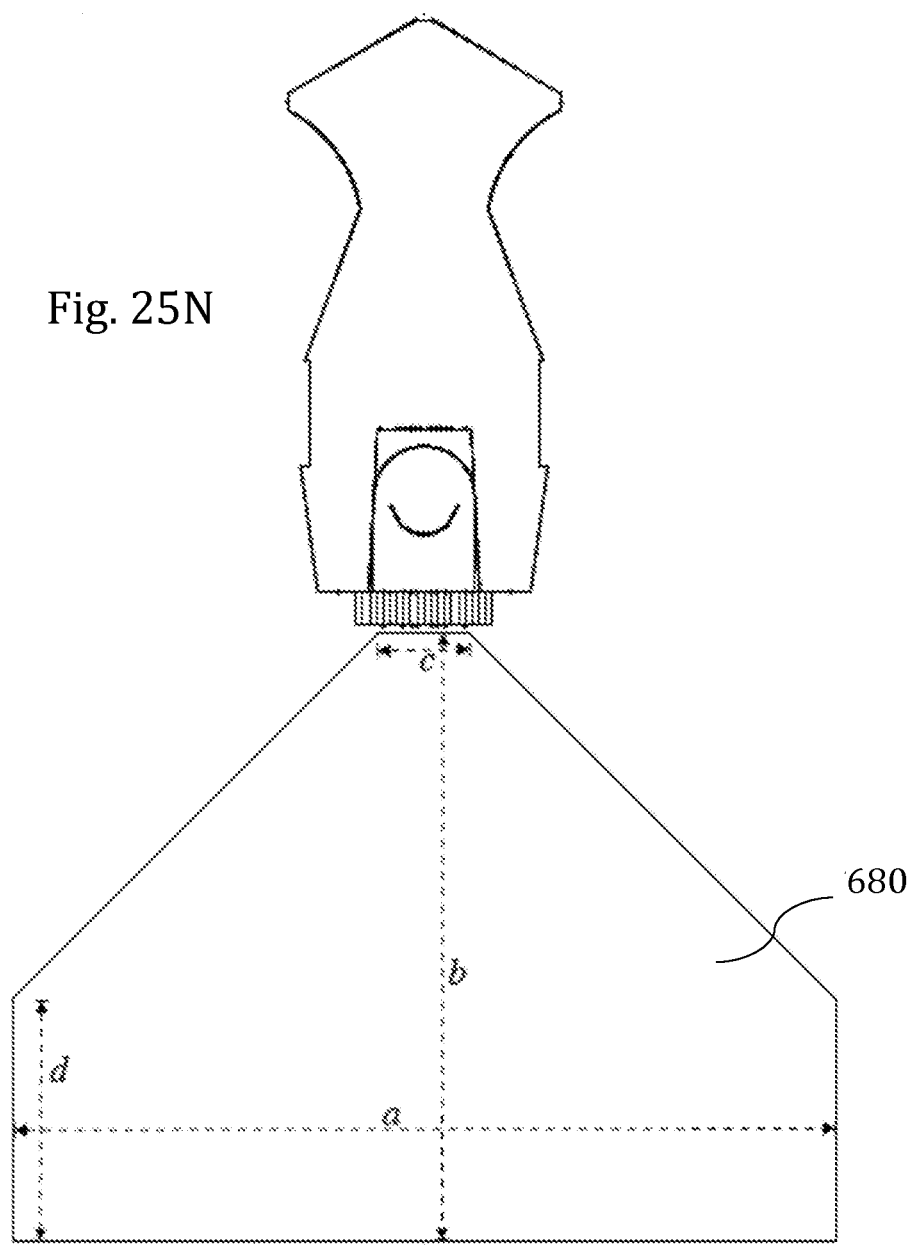

A specific embodiment of an optical device of the invention is illustrated in FIGS. 25A-25N. Optical device 500 is a hand held cylindrical device that has a picture tube of about 3 inches in diameter and an imaging assembly with a reflecting surface of about 45° relative to the cross-sectional plane of the picture tube. A vibration activated light emitting diode is powered by three 1.5 V triple A batteries through a circuit board. The light is set to remain on for 1 minute. Optical device 500 displays six images printed on a sheet of 10-inch×10-inch photographic paper that lines a cylindrical tube. A sectional view along the longitudinal plane of optical device 500 is shown in FIG. 25A. A sectional view along the longitudinal plane of light pipe 720 is provided in FIGS. 25B and 25C (enlarged view of base 722). FIGS. 25D-25M provide sectional views of mirrored member 560 (25D), imaging assembly base 580 (25E), anchor member 600 (25F—longitudinal section, and 25G—transverse section), posterior cover 620 (FIG. 25H), picture tube 520 (FIG. 25I), end ring 526 (FIG. 25J), outer sleeve 740 (FIG. 25K), battery holder 640 (FIG. 25L), battery holder 660 (FIG. 25M) and circuit board 680 (FIG. 25N).

The following table summarizes the reference numbers used herein.

| | |
|---|---|
| Optical device 100 | Optical device 500 |
| Picture tube 120 | Picture tube 520 |
|   Body section 120B |   Body section 520B |
|   End ring 126: 126I, 126O and 126G |   End ring 526: 526I, 526O and 526G |
| Imaging assembly 140 | Imaging assembly 540 |
|   Mirrored member 160 |   Mirrored member 560 |
|     Reflecting surface 162 |     Reflecting surface 562 |
|     Peripheral flange 164 |     Peripheral flange 564 |
|     Apical opening 163 |     Apical opening 563 |
|     Posterior cavity 165 |     Posterior cavity 565 |
|     Viewing chamber 167 |     Viewing chamber 567 |
|   Assembly base 180 |   Assembly base 580 |
|     Base 182 |     Base 582 |
|     Lateral side 184 |     Lateral side 584 |
|     Opening 181, 183 |     Opening 581, 583 |
|     Opening 185 |     Opening 585 |
|   Anchor member 200 |   Anchor member 600 |
|     H-shaped body 202 with side 204 and center bridge 206 |     H-shaped body 602 with side 604 and center bridge 606 |
|     Anterior flange 208 with fastener 212 |     Anterior flange 608 with fastener 612 |
|     Posterior flange 210 with fastener 214 |     Posterior flange 610 with fastener 614 |
|     Battery box fastener 216 |     Battery box fastener 616 |
|   Posterior cover 220 |   Posterior cover 620 |
|     Base section 222, |     Base section 622, |
|     Tapered side 224 |     Tapered side 624 |
|     Opening 223 |     Opening 623 |
|     Peripheral flange 226 |     Peripheral flange 626 |
|   Battery box 240 |   Battery box 640 |
|   Battery box 260 |   Battery box 660 |
|   Circuit board 280 |   Circuit board 680 |
|   Light source 300 |   Light source 700 |
|   Light pipe 320 |   Light pipe 720 |
|     Base 322 |     Base 722 |
|     Narrow mid section 324 |     Narrow mid section 724 |
|     Rising taper 326 |     Rising taper 726 |
|     Outwardly flared section 328 |     Outwardly flared section 728 |
|     Cone base 330 |     Cone base 730 |
|     Conical section 332 |     Conical section 732 |
|     Opening 321 |     Opening 721 |
| Outer sleeve 340 | Outer sleeve 740 |
|   Anterior end 340A |   Anterior end 740A |
|   Posterior end 340P |   Posterior end 740P |
| Imaging lens 360 | |

Other Embodiments of the Invention

While the invention has been described in conjunction with the detailed description, the foregoing description is intended to illustrate and not limit the scope of the invention, which is defined by the scope of the claims. Other aspects, advantages, and modifications are within the scope of the following claims.

The terms and expressions that have been employed are used as terms of description and not of limitation, and there is no intent in the use of such terms and expressions to exclude any equivalent of the features shown and described or portions thereof. Thus, it will be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims. In addition, the invention has been described broadly and generically herein. Each of the narrower species and subgeneric groupings falling within the generic disclosure also form part of the invention.

As used herein and in the appended claims, the singular forms "a," "an," and "the" include plural reference unless the context clearly dictates otherwise. Under no circumstances may the patent application be interpreted to be limited to the specific examples or embodiments or methods specifically disclosed herein.

What is claimed is:

1. An optical device comprising a picture tube that encloses an imaging assembly, wherein:
   (a) the picture tube comprises a body section adjoining an anterior and a posterior end, the body section comprising a cavity that encloses the imaging assembly, the body section comprising one or more images disposed on its interior surface, and
   (b) the imaging assembly comprises a mirrored member having a substantially convex reflecting surface oriented toward the anterior end of the picture tube at an angle less than 90° relative to the cross-sectional plane of the picture tube, thereby allowing the imaging assembly to reflect the one or more images on the picture tube forwardly of the reflecting surface so as to be viewable at the anterior end of the device; a light source disposed at the apex of the substantially convex reflecting surface; and an anchor member, the anterior end of which is secured to the mirrored member.

2. The optical device of claim 1, wherein the picture tube comprises a circular, triangular, square, rectangular, pentagonal or hexagonal cross-sectional opening.

3. The optical device of claim 1, wherein the imaging assembly comprises a conical, pyramidal or frustoconical mirrored member, and wherein the reflecting surface is the lateral surface of the conical, pyramidal, or frustoconical mirrored member.

4. The optical device of claim 1, wherein the reflecting surface is about 45° relative to the cross-sectional plane of the picture tube.

5. The optical device of claim 1, wherein the light source is a light emitting diode.

6. The optical device of claim 1, wherein the imaging assembly comprises a frustoconical mirrored member and a light pipe partially inserted through the apical opening of the frustoconical mirrored member, the light pipe being effective to transmit light from the light source in the cavity of the imaging assembly to the one or more images on the picture tube forwardly of the reflecting surface.

7. The optical device of claim 1, wherein the imaging assembly further comprises an electronic circuit coupling the light source to a power source, wherein the power source is one or more batteries.

8. The optical device of claim 7, wherein the one or more batteries is housed in a battery box secured to the anchor member.

9. The optical device of claim 7, further comprising an outer sleeve, wherein:
  (a) the outer sleeve comprises a body section adjoining an anterior and a posterior end, and
  (b) the body section of the outer sleeve comprises a cavity, the cross-section of which is substantially coterminous with the cross-section of the picture tube so as to enable the picture tube to be inserted into the cavity of the outer sleeve, the outer surface of the picture tube being in slideable contact with the interior surface of the outer sleeve.

10. An optical device comprising a picture tube that encloses an imaging assembly and an outer sleeve within which the picture tube is inserted, wherein:
  (a) the picture tube comprises a body section adjoining an anterior and a posterior end, the body section comprising a cavity that encloses the imaging assembly, the body section comprising one or more images disposed on its interior surface;
  (b) the imaging assembly comprises (i) a mirrored member having a reflecting surface oriented toward the anterior end of the picture tube at an angle less than 90° relative to the cross-sectional plane of the picture tube so as to form a viewing chamber within the picture tube forwardly of the reflecting surface within which the one or more images on the picture tube that is forwardly of the reflecting surface is viewable at the anterior end of the device, and (ii) an anchor member, the anterior end of which is secured to the mirrored member and the posterior end secured to a posterior device cover; and
  (c) the outer sleeve comprises a body section adjoining an anterior and a posterior end, the body section of the outer sleeve comprising a cavity having a cross-section substantially coterminous with the cross-section of the picture tube so as to enable the picture tube to be inserted into the cavity of the outer sleeve, the outer surface of the picture tube being in slideable contact with the interior surface of the outer sleeve.

11. The optical device of claim 10, wherein the anchor member is secured to the mirrored member and posterior device cover through a snap fit mechanism, an adhesive, or one or more screws, pins or rivets.

12. The optical device of claim 10, wherein the anchor member, mirrored member and posterior device cover are integrally molded.

13. The optical device of claim 10, further comprising a light source, wherein the light source is disposed on the device so as to be effective to illuminate the viewing chamber.

14. The optical device of claim 13, wherein the light source is a light emitting diode.

15. The optical device of claim 13, wherein the light source is attached to the peripheral edge of the reflecting surface of the mirrored member and is oriented toward the anterior end of the device so as to illuminate the one or more images forwardly of the reflecting surface.

16. The optical device of claim 13, wherein the light source is attached to the anterior end of the device and oriented into the device so as to illuminate the one or more images on the picture tube.

17. The optical device of claim 13, wherein the light source is secured to the outer sleeve of the device.

18. The optical device of claim 13, further comprising an electronic circuit coupling the light source to a power source, wherein the power source is one or more batteries.

19. The optical device of claim 13, wherein the light source disposed on the exterior of the picture tube or at the base edge of the picture tube.

20. An optical device comprising a picture tube that encloses an imaging assembly and a light source for illumination, wherein:
  (a) the picture tube comprises a body section adjoining an anterior and a posterior end, the body section comprising a cavity that encloses the imaging assembly, the body section comprising one or more images disposed on its interior surface;
  (b) the imaging assembly comprises (i) a mirrored member having a reflecting surface oriented toward the anterior end of the picture tube at an angle less than 90° relative to the cross-sectional plane of the picture tube so as to form a viewing chamber within the picture tube forwardly of the reflecting surface within which the one or more images on the picture tube that is forwardly of the reflecting surface is viewable at the anterior end of the device, and (ii) an anchor member, the anterior end of which is secured to the mirrored member; and
  (c) the light source is disposed on the exterior of the picture tube or at the base edge of the picture tube.

* * * * *